US012750312B2

(12) United States Patent
Dutta

(10) Patent No.: US 12,750,312 B2
(45) Date of Patent: Sep. 29, 2026

(54) ADDRESS REGISTRATION

(71) Applicant: NOKIA SOLUTIONS AND NETWORKS OY, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 1085 days.

(21) Appl. No.: 17/135,453

(22) Filed: Dec. 28, 2020

(65) Prior Publication Data

US 2022/0210064 A1 Jun. 30, 2022

(51) Int. Cl.
*H04L 45/74* (2022.01)

(52) U.S. Cl.
CPC .................................... *H04L 45/74* (2013.01)

(58) Field of Classification Search
CPC ....... H04L 45/04; H04L 45/66; H04L 45/745; H04L 45/64; H04L 45/02; H04L 12/4641; H04L 45/38; H04L 69/22; H04L 45/74; H04L 12/4633
USPC .......................................................... 370/392
See application file for complete search history.

(56) References Cited

U.S. PATENT DOCUMENTS

| | | | | |
|---|---|---|---|---|
| 7,546,358 B1 * | 6/2009 | Ochiai | H04L 69/22 | 709/227 |
| 7,646,759 B2 * | 1/2010 | Hegde | H04L 45/50 | 370/351 |
| 7,853,720 B2 * | 12/2010 | Choi | H04L 61/4511 | 709/227 |
| 8,625,609 B2 * | 1/2014 | Sarikaya | H04W 48/16 | 370/335 |

(Continued)

FOREIGN PATENT DOCUMENTS

| | | | |
|---|---|---|---|
| WO | WO-2018104769 A1 * | 6/2018 | H04L 45/7453 |
| WO | WO-2021021172 A1 * | 2/2021 | H04L 45/00 |

OTHER PUBLICATIONS

VXLAN and EVPN for data center network transformation Talvinder Singh;Varun Jain;G Satish Babu 2017 8th International Conference on Computing, Communication and Networking Technologies (ICCCNT) Year: 2017 | Conference Paper | Publisher: IEEE (Year: 2017).*

(Continued)

*Primary Examiner* — Ninos Donabed
(74) *Attorney, Agent, or Firm* — Tong, Rea, Bentley & Panagos, LLC

(57) ABSTRACT

Various example embodiments for address registration in a communication system are presented. Various example embodiments for supporting address registration in a communication system may be configured to support address registration in-band in the data plane of the communication system. Various example embodiments for supporting (Continued)

address registration in-band in the data plane of a communication system may be configured to support address registration in-band in the data plane of the communication system based on use of a data plane header configured to support address registration in-band in the data plane of the communication system (e.g., based on use of a destination address field of the data plane header to indicate that the data plane header is being used for an address registration operation and use of a source address field of the data plane header to indicate the address(es) for which the address registration operation is to be performed).

12 Claims, 25 Drawing Sheets

(56) References Cited

U.S. PATENT DOCUMENTS

| | | | | |
|---|---|---|---|---|
| 8,792,409 | B2 * | 7/2014 | Borleske | H04W 40/04 370/243 |
| 9,148,845 | B2 * | 9/2015 | Guo | H04W 8/005 |
| 9,319,317 | B1 * | 4/2016 | Spadaro | H04L 45/745 |
| 10,469,361 | B1 | 11/2019 | Bayross et al. | |
| 10,616,101 | B1 * | 4/2020 | Peterson | H04L 45/08 |
| 11,032,197 | B2 * | 6/2021 | Nainar | H04L 45/745 |
| 11,095,559 | B1 * | 8/2021 | Garvia | H04L 45/124 |
| 2002/0114328 | A1 * | 8/2002 | Miyamoto | H04L 12/46 370/386 |
| 2003/0193949 | A1 * | 10/2003 | Kojima | H04L 69/22 370/392 |
| 2004/0052216 | A1 * | 3/2004 | Roh | H04L 12/2874 370/252 |
| 2010/0007914 | A1 * | 1/2010 | Watanabe | H04N 1/001 358/1.15 |
| 2011/0134797 | A1 * | 6/2011 | Banks | H04W 40/246 370/254 |
| 2013/0238769 | A1 * | 9/2013 | Asati | H04L 61/103 709/220 |
| 2015/0085696 | A1 * | 3/2015 | Guo | H04W 48/16 370/254 |
| 2020/0134308 | A1 * | 4/2020 | Javadi | G06V 30/40 |
| 2020/0280537 | A1 | 9/2020 | Alapati et al. | |
| 2020/0382466 | A1 * | 12/2020 | Ly | H04L 61/5061 |

OTHER PUBLICATIONS

Measuring the Control-Data Plane Consistency in Software Defined Networking Kai Lei; Keke Li; Junlin Huang; Yi Wang 2018 IEEE International Conference on Communications (ICC) Year: 2018 | Conference Paper | Publisher: IEEE (Year: 2018).*

P. Dutta, Internet Engineering Task Force (IETF) Request for Comments: 7361 Category: Standards Track (Year: 2014).*

IEEE, "IEEE Standard for Local and Metropolitan Area Networks, Bridges and Bridged Networks," IEEE Standard 802.1Q, IEEE Computer Society, 2018, 1993 pages.

IEEE, "802.1D—MAC Bridges," printed from http://www.ieee802.org/1/pages/802.1D.html on May 10, 2022, 1 page.

IEEE, "802.1w—Rapid Reconfiguration of Spanning Tree," printed from http://www.ieee802.org/1/pages/802.1w.html on May 10, 2022, 1 page.

IEEE, "802.1s—Multiple Spanning Trees," printed from http://www.ieee802.org/1/pages/802.1s.html on May 10, 2022, 1 page.

IEEE, "802.1ad—Provider Bridges," printed from http://www.ieee802.org/1/pages/802.1ad.html on May 10, 2022, 4 pages.

IEEE, "802.1ah—Provider Backbone Bridges," printed from http://www.ieee802.org/1/pages/802.1ah.html on May 10, 2022, 5 pages.

Iana, "IEEE 802 Numbers," printed from https://www.iana.org/assignments/ieee-802-numbers/ieee-802-numbers.xhtml on May 10, 2022, 17 pages.

IEEE, "802.1ak—Multiple Registration Protocol," printed from https://www.ieee802.org/1/pages/802.1ak.html on May 10, 2022, 3 pages.

IEEE, "802.1Qbe—Multiple I-SID Registration Protocol," printed from https://www.ieee802.org/1/pages/802.1be.html on May 10, 2022, 3 pages.

EP Search Report mailed in corresponding EP Application No. 21217306.6 On Apr. 28, 2022, 10 pages.

* cited by examiner

ETHERNET PACKET
200

COMMUNICATION SYSTEM
300

*FIG. 4*

| MAC FORWARDING TABLE: B1 | |
|---|---|
| MAC | EGRESS PORT(S) |
| | |
| FLOOD | B1->M1, B1->B2, B1->B3 |
| M1 | B1->M1 |
| | |

*FIG. 5*

| MAC FORWARDING TABLE: B1 | |
|---|---|
| MAC | EGRESS PORT(S) |
| | |
| FLOOD | B1->M1, B1->B2, B1->B3 |
| M1 | B1->M1 |
| M2 | B1->B2 |
| | |

PROVIDER BRIDGED NETWORK 1000

*FIG. 11A*

| VLAN 40 MAC FORWARDING TABLE IN PB1 | |
|---|---|
| BMAC | EGRESS PORT(S) |
| FLOOD | ...... |
| M1 | LINK TO CUSTOMER N/W 1 |
| M2 | ... |
| ... | .. |
| ... | .. |

*FIG. 11B*

| VLAN 40 MAC FORWARDING TABLE IN PB2 | |
|---|---|
| BMAC | EGRESS PORT(S) |
| FLOOD | ...... |
| M1 | ...... |
| M2 | LINK TO CUSTOMER N/W 1 |
| ... | .. |
| ... | .. |

*FIG. 14*

| I-SID 100 FORWARDING TABLE IN BEB-1 | |
|---|---|
| B-VLAN=50 | |
| CMAC | BMAC OR EGRESS PORT |
| M2 | B2 |
| .. | .. |
| .. | .. |

*FIG. 15*

| B-VLAN 50 MAC FORWARDING TABLE IN BEB-1 | |
|---|---|
| BMAC | EGRESS PORT(S) |
| FLOOD | ...... |
| B1 | LOCAL |
| B2 | LINK TO BCB-1 |
| B3 | .. |
| B4 | .. |

*FIG. 16*

| B-VLAN 50 MAC FORWARDING TABLE IN BEB-2 | |
|---|---|
| BMAC | EGRESS PORT(S) |
| FLOOD | …… |
| B1 | … |
| B2 | LOCAL |
| B3 | .. |
| B4 | .. |

*FIG. 17*

| I-SID 100 FORWARDING TABLE IN BEB-2 | |
|---|---|
| B-VLAN=50 | |
| CMAC | BMAC OR EGRESS PORT |
| M1 | B1 |
| M2 | LINK 1 |
| .. | .. |

*FIG. 18*

| **OPERATION** | **NO PROPAGATE** | **PROPAGATE** |
|---|---|---|
| **MAC POPULATE** | MRG-ADD | MRG-ADD-PROP |
| **POSITIVE MAC PURGE** | MRG-DEL-POS | MRG-DEL-POS-PROP |
| **NEGATIVE MAC PURGE** | MRG-DEL-NEG | MRG-DEL-NEG-PROP |

ADDRESS REGISTRATION

TECHNICAL FIELD

Various example embodiments relate generally to communication systems and, more particularly but not exclusively, to supporting address registration in communication systems.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support communication of a data plane header including a source address field and a destination address field, wherein the destination address field includes an address configured to indicate that the data plane header is being used to perform an address registration operation based on the source address field. In at least some example embodiments, the address is configured to indicate that the address registration operation is an address populate operation, a positive address purge operation, or a negative address purse operation. In at least some example embodiments, the address is configured to indicate whether or not the data plane header is to be propagated to an upper hierarchy. In at least some example embodiments, the address is configured to indicate one of an address populate operation that is not to be further propagated, an address populate operation that is to be further propagated, a positive address purge operation that is not to be further propagated, a positive address purge operation that is to be further propagated, a negative address purge operation that is not to be further propagated, or a negative address purge operation that is to be further propagated. In at least some example embodiments, the address is configured to indicate that the address registration operation is an address populate operation. In at least some example embodiments, the source address field includes an address to be populated in a forwarding table. In at least some example embodiments, the address is configured to indicate that the address registration operation is an address purge operation. In at least some example embodiments, the source address field includes an address to be purged from a forwarding table. In at least some example embodiments, the source address field includes a value indicative that a set of addresses is to be purged from a forwarding table. In at least some example embodiments, the address is configured to indicate that the address registration operation is a positive address purge operation. In at least some example embodiments, the source address field includes a value indicative that all addresses of a forwarding table, with the exception of any addresses learned from a sender, are to be purged from the forwarding table. In at least some example embodiments, the sender is a neighbor or link in a context of the data plane header. In at least some example embodiments, the address is configured to indicate that the address registration operation is a negative address purge operation. In at least some example embodiments, the source address field includes a value indicative that all addresses of a forwarding table that were learned from a sender are to be purged from the forwarding table. In at least some example embodiments, the sender is a neighbor in a context of the data plane header. In at least some example embodiments, to support communication of the data plane header, the set of instructions is configured to, when executed by the at least one processor, cause the apparatus to identify, based on the address, that the data plane header is being used to perform an address registration operation. In at least some example embodiments, to support communication of the data plane header, the set of instructions is configured to, when executed by the at least one processor, cause the apparatus to prevent use of the source address field for an address learning operation based on a determination, based on the address, that the data plane header is being used to perform an address registration operation. In at least some example embodiments, to support communication of the data plane header, the set of instructions is configured to, when executed by the at least one processor, cause the apparatus to identify, based on a data plane context of the data plane header, a forwarding table to be acted upon based on the data plane header. In at least some example embodiments, to identify the forwarding table to be acted upon based on the data plane header, the set of instructions is configured to, when executed by the at least one processor, cause the apparatus to determine, based on a determination that the data plane header is associated with an untagged packet, that the forwarding table to be acted upon by the data plane header is a forwarding table associated with a port on which the data plane header is received, determine, based on a determination that the data plane header is associated with an 802.1q tagged packet, that the forwarding table to be acted upon by the data plane header is a forwarding table associated with a virtual local area network (VLAN) identifier (VID), determine, based on a determination that the data plane header is associated with an 802.1ad tagged packet, that the forwarding table to be acted upon by the data plane header is a forwarding table associated with a service VID (S-VID), or determine, based on a determination that the data plane header is associated with an 802.1ah tagged packet, that the forwarding table to be acted upon by the data plane header is a forwarding table associated with a backbone service instance identifier (I-SID). In at least some example embodiments, the data plane header is an Ethernet header, and the address registration operation is a Media Access Control (MAC) address registration operation. In at least some example embodiments, the address is a MAC Registration Group (MRG) Address. In at least some example embodiments, the data plane header is an Internet Protocol (IP) header, and the address registration operation is an IP address registration operation. In at least some example embodiments, the data plane header is associated with a payload.

In at least some example embodiments, a non-transitory computer-readable medium stores a set of instructions configured to cause an apparatus to support communication of a data plane header including a source address field and a destination address field, wherein the destination address field includes an address configured to indicate that the data plane header is being used to perform an address registration operation based on the source address field. In at least some example embodiments, the address is configured to indicate that the address registration operation is an address populate operation, a positive address purge operation, or a negative address purse operation. In at least some example embodiments, the address is configured to indicate whether or not the data plane header is to be propagated to an upper hierarchy. In at least some example embodiments, the address is configured to indicate one of an address populate operation that is not to be further propagated, an address populate operation that is to be further propagated, a positive address purge operation that is not to be further propagated, a positive address purge operation that is to be further propagated, a negative address purge operation that is not to be further propagated, or a negative address purge operation that is to be further propagated. In at least some example embodiments, the address is configured to indicate that the address registration operation is an address populate operation. In at least some example embodiments, the source address field includes an address to be populated in a forwarding table. In at least some example embodiments, the address is configured to indicate that the address registration operation is an address purge operation. In at least some example embodiments, the source address field includes an address to be purged from a forwarding table. In at least some example embodiments, the source address field includes a value indicative that a set of addresses is to be purged from a forwarding table. In at least some example embodiments, the address is configured to indicate that the address registration operation is a positive address purge operation. In at least some example embodiments, the source address field includes a value indicative that all addresses of a forwarding table, with the exception of any addresses learned from a sender, are to be purged from the forwarding table. In at least some example embodiments, the sender is a neighbor or link in a context of the data plane header. In at least some example embodiments, the address is configured to indicate that the address registration operation is a negative address purge operation. In at least some example embodiments, the source address field includes a value indicative that all addresses of a forwarding table that were learned from a sender are to be purged from the forwarding table. In at least some example embodiments, the sender is a neighbor in a context of the data plane header. In at least some example embodiments, to support communication of the data plane header, the set of instructions is configured to cause the apparatus to identify, based on the address, that the data plane header is being used to perform an address registration operation. In at least some example embodiments, to support communication of the data plane header, the set of instructions is configured to cause the apparatus to prevent use of the source address field for an address learning operation based on a determination, based on the address, that the data plane header is being used to perform an address registration operation. In at least some example embodiments, to support communication of the data plane header, the set of instructions is configured to cause the apparatus to identify, based on a data plane context of the data plane header, a forwarding table to be acted upon based on the data plane header. In at least some example embodiments, to identify the forwarding table to be acted upon based on the data plane header, the set of instructions is configured to cause the apparatus to determine, based on a determination that the data plane header is associated with an untagged packet, that the forwarding table to be acted upon by the data plane header is a forwarding table associated with a port on which the data plane header is received, determine, based on a determination that the data plane header is associated with an 802.1q tagged packet, that the forwarding table to be acted upon by the data plane header is a forwarding table associated with a virtual local area network (VLAN) identifier (VID), determine, based on a determination that the data plane header is associated with an 802.1ad tagged packet, that the forwarding table to be acted upon by the data plane header is a forwarding table associated with a service VID (S-VID), or determine, based on a determination that the data plane header is associated with an 802.1ah tagged packet, that the forwarding table to be acted upon by the data plane header is a forwarding table associated with a backbone service instance identifier (I-SID). In at least some example embodiments, the data plane header is an Ethernet header, and the address registration operation is a Media Access Control (MAC) address registration operation. In at least some example embodiments, the address is a MAC Registration Group (MRG) Address. In at least some example embodiments, the data plane header is an Internet Protocol (IP) header, and the address registration operation is an IP address registration operation. In at least some example embodiments, the data plane header is associated with a payload.

In at least some example embodiments, a method includes supporting communication of a data plane header including a source address field and a destination address field, wherein the destination address field includes an address configured to indicate that the data plane header is being used to perform an address registration operation based on the source address field. In at least some example embodiments, the address is configured to indicate that the address registration operation is an address populate operation, a positive address purge operation, or a negative address purse operation. In at least some example embodiments, the address is configured to indicate whether or not the data plane header is to be propagated to an upper hierarchy. In at least some example embodiments, the address is configured to indicate one of an address populate operation that is not to be further propagated, an address populate operation that is to be further propagated, a positive address purge operation that is not to be further propagated, a positive address purge operation that is to be further propagated, a negative address purge operation that is not to be further propagated, or a negative address purge operation that is to be further propagated. In at least some example embodiments, the address is configured to indicate that the address registration operation is an address populate operation. In at least some example embodiments, the source address field includes an address to be populated in a forwarding table. In at least some example embodiments, the address is configured to indicate that the address registration operation is an address purge operation. In at least some example embodiments, the source address field includes an address to be purged from a forwarding table. In at least some example embodiments, the source address field includes a value indicative that a set of addresses is to be purged from a forwarding table. In at least some example embodiments, the address is configured to indicate that the address registration operation is a positive address purge operation. In at least some example embodiments, the source address field includes a value indicative that all addresses of a forwarding table, with the exception of any addresses learned from a sender, are to be purged from the forwarding table. In at least some example embodiments, the sender is a neighbor or link in a context of the data plane header. In at least some example embodiments, the address is configured to indicate that the address registration operation is a negative address purge operation. In at least some example embodiments, the source address field includes a value indicative that all addresses of a forwarding table that were learned from a sender are to be purged from the forwarding table. In at least some example embodiments, the sender is a neighbor in a context of the data plane header. In at least some example embodiments, supporting communication of the data plane header includes identifying, based on the address, that the data plane header is being used to perform an address registration operation. In at least some example embodiments, supporting communication of the data plane header includes preventing use of the source address field for an address learning operation based on a determination, based on the address, that the data plane header is being used to perform an address registration operation. In at least some example embodiments, supporting communication of the data plane header includes identifying, based on a data plane context of the data plane header, a forwarding table to be acted upon based on the data plane header. In at least some example embodiments, identifying the forwarding table to be acted upon based on the data plane header includes determining, based on a determination that the data plane header is associated with an untagged packet, that the forwarding table to be acted upon by the data plane header is a forwarding table associated with a port on which the data plane header is received, determining, based on a determination that the data plane header is associated with an 802.1q tagged packet, that the forwarding table to be acted upon by the data plane header is a forwarding table associated with a virtual local area network (VLAN) identifier (VID), determining, based on a determination that the data plane header is associated with an 802.1ad tagged packet, that the forwarding table to be acted upon by the data plane header is a forwarding table associated with a service VID (S-VID), or determining, based on a determination that the data plane header is associated with an 802.1ah tagged packet, that the forwarding table to be acted upon by the data plane header is a forwarding table associated with a backbone service instance identifier (I-SID). In at least some example embodiments, the data plane header is an Ethernet header, and the address registration operation is a Media Access Control (MAC) address registration operation. In at least some example embodiments, the address is a MAC Registration Group (MRG) Address. In at least some example embodiments, the data plane header is an Internet Protocol (IP) header, and the address registration operation is an IP address registration operation. In at least some example embodiments, the data plane header is associated with a payload.

In at least some example embodiments, an apparatus includes means for supporting communication of a data plane header including a source address field and a destination address field, wherein the destination address field includes an address configured to indicate that the data plane header is being used to perform an address registration operation based on the source address field. In at least some example embodiments, the address is configured to indicate that the address registration operation is an address populate operation, a positive address purge operation, or a negative address purse operation. In at least some example embodiments, the address is configured to indicate whether or not the data plane header is to be propagated to an upper hierarchy. In at least some example embodiments, the address is configured to indicate one of an address populate operation that is not to be further propagated, an address populate operation that is to be further propagated, a positive address purge operation that is not to be further propagated, a positive address purge operation that is to be further propagated, a negative address purge operation that is not to be further propagated, or a negative address purge operation that is to be further propagated. In at least some example embodiments, the address is configured to indicate that the address registration operation is an address populate operation. In at least some example embodiments, the source address field includes an address to be populated in a forwarding table. In at least some example embodiments, the address is configured to indicate that the address registration operation is an address purge operation. In at least some example embodiments, the source address field includes an address to be purged from a forwarding table. In at least some example embodiments, the source address field includes a value indicative that a set of addresses is to be purged from a forwarding table. In at least some example embodiments, the address is configured to indicate that the address registration operation is a positive address purge operation. In at least some example embodiments, the source address field includes a value indicative that all addresses of a forwarding table, with the exception of any addresses learned from a sender, are to be purged from the forwarding table. In at least some example embodiments, the sender is a neighbor or link in a context of the data plane header. In at least some example embodiments, the address is configured to indicate that the address registration operation is a negative address purge operation. In at least some example embodiments, the source address field includes a value indicative that all addresses of a forwarding table that were learned from a sender are to be purged from the forwarding table. In at least some example embodiments, the sender is a neighbor in a context of the data plane header. In at least some example embodiments, the means for supporting communication of the data plane header includes means for identifying, based on the address, that the data plane header is being used to perform an address registration operation. In at least some example embodiments, the means for supporting communication of the data plane header includes means for preventing use of the source address field for an address learning operation based on a determination, based on the address, that the data plane header is being used to perform an address registration operation. In at least some example embodiments, the means for supporting communication of the data plane header includes means for identifying, based on a data plane context of the data plane header, a forwarding table to be acted upon based on the data plane header. In at least some example embodiments, the means for identifying the forwarding table to be acted upon based on the data plane header includes means for determining, based on a determination that the data plane header is associated with an untagged packet, that the forwarding table to be acted upon by the data plane header is a forwarding table associated with a port on which the data plane header is received, means for determining, based on a determination that the data plane header is associated with an 802.1q tagged packet, that the forwarding table to be acted upon by the data plane header is a forwarding table associated with a virtual local area network (VLAN) identifier (VID), means for determining, based on a determination that the data plane header is associated with an 802.1ad tagged packet, that the forwarding table to be acted upon by the data plane header is a forwarding table associated with a service VID (S-VID), or means for determining, based on a determination that the data plane header is associated with an 802.1ah tagged packet, that the forwarding table to be acted upon by the data plane header is a forwarding table associated with a backbone service instance identifier (I-SID). In at least some example embodiments, the data plane header is an Ethernet header, and the address registration operation is a Media Access Control (MAC) address registration operation. In at least some example embodiments, the address is a MAC Registration Group (MRG) Address. In at least some example embodiments, the data plane header is an Internet Protocol (IP) header, and the address registration operation is an IP address registration operation. In at least some example embodiments, the data plane header is associated with a payload.

BRIEF DESCRIPTION OF THE DRAWINGS

The teachings herein can be readily understood by considering the following detailed description in conjunction with the accompanying drawings, in which:

FIG. 4 depicts an example embodiment of MAC forwarding table in a bridge of the Ethernet network of FIG. 3;

FIG. 5 depicts an example embodiment of MAC forwarding table in a bridge of the Ethernet network of FIG. 3;

FIGS. 11A and 11B depict example embodiments of MAC forwarding tables in provider bridges of the PBN of FIG. 10;

FIG. 14 depicts an example embodiment of an I-SID forwarding table in a backbone Ethernet bridge of the communication system of FIG. 13;

FIG. 15 depicts an example embodiment of a MAC forwarding table in a backbone Ethernet bridge of the communication system of FIG. 13;

FIG. 16 depicts an example embodiment of a MAC forwarding table in a backbone Ethernet bridge of the communication system of FIG. 13;

FIG. 17 depicts an example embodiment of an I-SID forwarding table in a backbone Ethernet bridge of the communication system of FIG. 13;

FIG. 18 depicts a matrix illustrating the six types of MAC Registration Groups (MRGs) which may be used as destination MAC addresses (DMACs) in MAC address registration messages for controlling MAC address registration operations;

To facilitate understanding, identical reference numerals have been used herein, wherever possible, in order to designate identical elements that are common among the various figures.

DETAILED DESCRIPTION

Figure 1:
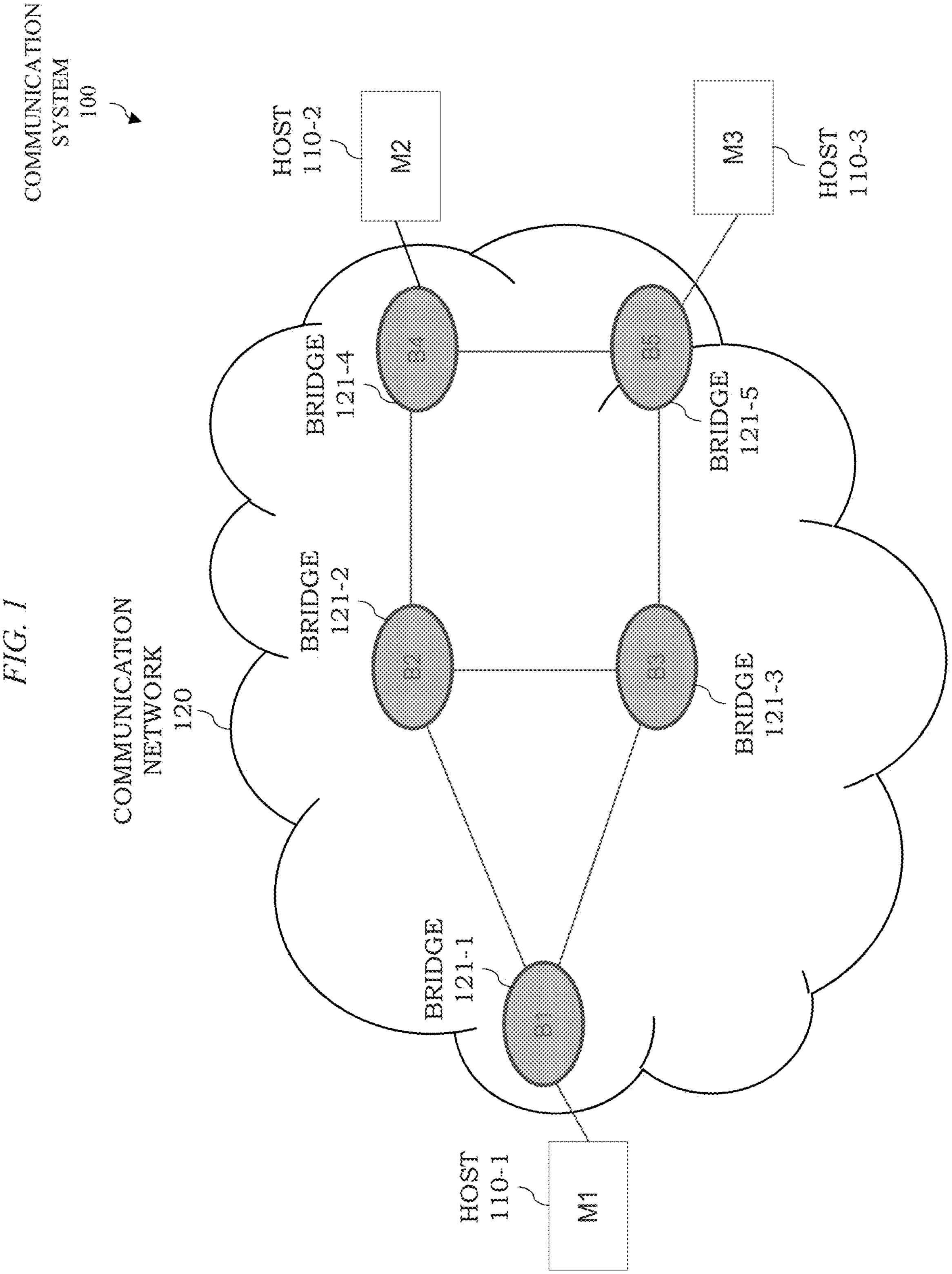
FIG. 1 depicts an example embodiment of a communication system configured to support Media Access Control (MAC) address registration in an Ethernet network.

Various example embodiments for supporting address registration in a communication system are presented herein.

Various example embodiments for supporting address registration in a communication system may be configured to support address registration in-band in the data plane of the communication system. Various example embodiments for supporting address registration in-band in the data plane of a communication system may be configured to support address registration in-band in the data plane of the communication system based on use of a data plane header configured to support address registration in-band in the data plane of the communication system. Various example embodiments for supporting address registration in-band in the data plane of a communication system, based on use of a data plane header configured to support address registration in-band in the data plane of the communication system, may be configured to use a destination address field of the data plane header to indicate that the data plane header is being used for an address registration operation (e.g., that the data plane packet that includes the data plane header, which may or may not have a payload associated therewith, is an address registration packet) and to use a source address field of the data plane header to indicate the address(es) for which the address registration operation (e.g., populate or purge) is to be performed. Various example embodiments for supporting address registration in-band in the data plane of a communication system may be utilized within various types of communication systems (e.g., Ethernet-based communication systems for supporting Media Access Control (MAC) address registration in the Ethernet header, Internet Protocol (IP)-based communication systems for supporting IP address registration in the IP header, or the like, as well as various combinations thereof); however, for purposes of clarity in describing various aspects of in-band address registration, in-band address registration is primarily described within the context of Ethernet-based communication systems for supporting MAC address registration operations. It is noted that herein, unless indicated otherwise, the term "data plane header" refers to the header based on which a data plane (which also may be referred to as its forwarding plane) of a node in a network would make a forwarding decision on a packet (e.g., in an Ethernet network a bridge makes a forwarding decision based on an Ethernet header (e.g., outermost Ethernet header if MAC-in-MAC), in an IPv4 network a router makes a forwarding decision based on an IPv4 header (e.g., outermost IP header in IPv4-in-IPv4), in an IPv6 network a router makes a forwarding decision based on an IPv6 header (e.g., outermost IP header in IPv6-in-IPv6), and so forth). It is noted that herein, unless indicated otherwise, the term "registration" when discussing an address registration operation primarily means population or purging of one or more addresses in one or more address tables (e.g., forwarding table in Ethernet, routing table in IP, or the like) of a specific context and the term "in-band" used for describing an address registration operation primarily means that the address registration operation is performed using the data plane header alone without using a header of a control plane protocol (e.g., without using any fields of an upper layer header of a control protocol). It is noted that herein, unless indicated otherwise, an "in-band" control operation is a control operation using the dataplane header alone and the in-band control operation is an address registration operation that modifies the forwarding table that is used by the node for forwarding data packets. It is noted that the address registration message may be considered to be a data plane packet (e.g., where the data plane packet only includes the data plane header that is being used as the address registration message without any associated payload) or may be considered to be a portion of a data plane packet (e.g., the data plane header that is being used as the address registration message where the data plane packet also include an associated payload such as an Operations, Administration, and Maintenance (OAM) packet including an OAM payload). Various example embodiments presented herein may be configured to provide a simple and generic method for address registration in a communication network which operates in-band within the data plane of the communication network, thereby supporting efficient and reliable address registration in the communication network.

Various example embodiments for supporting address registration in a communication system may be configured to support MAC address registration in an Ethernet-based communication system. Various example embodiments for supporting MAC address registration in an Ethernet-based communication system may be configured to support MAC address registration in-band in the data plane of the Ethernet-based communication system. Various example embodiments for supporting MAC address registration in-band in the data plane of the Ethernet-based communication system may be configured to support MAC address registration based on encoding of an Ethernet header of an Ethernet packet (which may or may not include an associated payload) in a manner configured to cause bridges to process the Ethernet header as a MAC address registration message. Various example embodiments for supporting MAC address registration in-band in the data plane of the Ethernet-based communication system, based on encoding of an Ethernet header in a manner for causing bridges to process the Ethernet header as a MAC address registration message, may be based on use of (1) an address in the destination MAC (DMAC) address field of the Ethernet header that is configured to indicate that the Ethernet header is a MAC address registration message and (2) a value (e.g., a MAC address or a special value) in the source MAC (SMAC) address field of the Ethernet header that indicates the MAC address(es) for which the MAC address registration operation (e.g., populate or purge) is to be performed. It is noted that herein, unless indicated otherwise, the term "registration" when discussing a MAC address registration operation primarily means population or purging of one or more MAC addresses in one or more MAC forwarding tables of a specific context and the term "in-band" used for describing a MAC address registration operation primarily means that the MAC address registration operation is performed using fields in the data plane header (e.g., in the case of Ethernet networks, the data plane header is the Ethernet Header and the fields used to provide the MAC address registration operation are the DMAC and SMAC address fields as discussed above) alone (i.e., without using any fields of an upper layer header of a control protocol, such as Internet Group Management Protocol (IGMP), Multicast Listener Discovery (MLD), Generic Attribute Registration Protocol (GARP), Multiple MAC Registration Protocol (MMRP), or other types of control protocols). It is noted that herein, unless indicated otherwise, an in-band MAC address registration operation uses the dataplane header (namely, the Ethernet header) alone and the in-band MAC address registration operation modifies the MAC forwarding table that is used by the Ethernet bridge for forwarding data packets. It is noted that the MAC address registration message may be considered to be an Ethernet packet (e.g., where the Ethernet packet only includes the Ethernet header that is being used as the MAC address registration message without any associated payload) or may be considered to be a portion of an Ethernet packet (e.g., the Ethernet header that is being used as the MAC address registration message where the Ethernet packet also include an associated payload). Various example embodiments presented herein may be configured to provide a simple and generic method for MAC address registration in Ethernet networks which operates in-band within the Ethernet data plane and which is protocol independent, thereby supporting efficient and reliable MAC address registration in Ethernet networks and, thus, significantly improving traffic convergence in Ethernet networks.

It will be appreciated that these and various other example embodiments and advantages or potential advantages of supporting address registration in communication systems may be further understood by way of reference to the various figures, which are discussed further below.

FIG. 1 depicts an example embodiment of a communication system configured to support MAC address registration in an Ethernet network.

The communication system 100 includes a set of hosts 110-1-110-3 (collectively, hosts 110, which also are denoted as hosts M1-M3, respectively, for ease of reference) and an Ethernet network 120 configured to support communications between the hosts 110. The Ethernet network 120 includes a set of bridges 121-1 to 121-5 (collectively, bridges 121, which also are denoted as bridges B1-B5, respectively, for ease of reference) configured to support communications between the hosts 110 using Ethernet. The bridges 121 are configured to support communications between the hosts 110 using Ethernet by using MAC addresses. The bridges 121 maintain MAC forwarding tables which are populated based on MAC address learning and use the MAC forwarding tables for forwarding Ethernet packets of the hosts 110. The bridges 121 are configured to support MAC address learning based on the SMAC in the Ethernet header of a received packet and the receiving port. The bridges 121 are configured to support MAC address registration in-band in the data plane based on the DMAC and SMAC fields in the Ethernet header. The use of the DMAC and SMAC fields in the Ethernet header to support MAC address registration in-band in the data plane may be further understood by first considering various aspects of Ethernet technologies.

Ethernet is a layer-2 protocol in the Open Systems Interconnection (OSI) stack. Ethernet has become almost the default layer-2 protocol in a majority of the packet switched networks. The nodes in an Ethernet network are referred to as switches or bridges; although, for consistency, the term "bridge" is used herein for any device that operates at the Ethernet layer and forwards Ethernet packets. Any device operating in the Ethernet layer (host or bridge) is assigned a Media Access Control (MAC) address which uniquely identifies the device in the network. The size of a MAC address is 6B (i.e., 6 bytes). The Ethernet layer encapsulates a packet in an Ethernet Header, based on which packets are forwarded from source to destination within the network. Ethernet may be further understood by way of reference to an example Ethernet packet as presented in FIG. 2 and an example Ethernet network as presented in FIG. 3.

Figure 2:
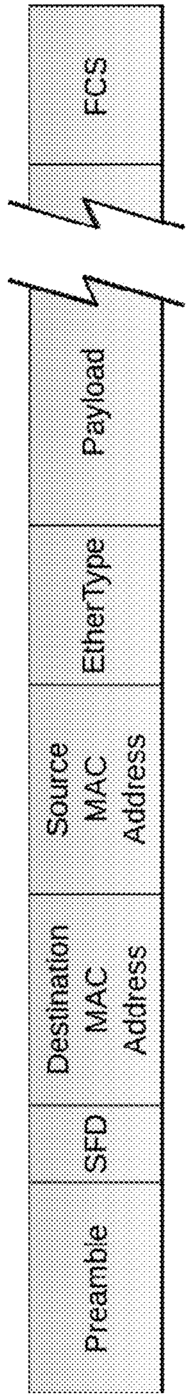
FIG. 2 depicts an example embodiment of an Ethernet packet format including a payload and an Ethernet header configured to support communications of the payload in an Ethernet network.

FIG. 2 depicts an example embodiment of an Ethernet packet format including a payload and an Ethernet header configured to support communications of the payload in an Ethernet network. In FIG. 2, the Ethernet packet 200 includes a payload and an Ethernet header. The Ethernet header includes various fields, including the Destination MAC address (DMAC) field (which typically specifies the address of the receiver of the packet), the Source MAC address (SMAC) field (which typically specifies the address of the sender of the packet), and the Ethertype field (which indicates the payload type of the Ethernet packet (e.g., Internet Protocol (IP), Multiprotocol Label Switching (MPLS), a type of Ethernet Control Protocol, or the like). Ethernet bridges use a table called a MAC forwarding table to control the forwarding of packets between ports. The table starts empty, and entries are added as the bridge receives packets. The SMAC of a packet is added as an entry into the table with the port of arrival as the forwarding port for the MAC address. If the DMAC entry is not found in the table, the packet is flooded to all other ports of the bridge, except the one from which it was received. By means of these flooded packets, a host in the network will respond and a MAC database entry will be created. Such flooded packets are called "unlearned unicast" packets. So, both SMAC and DMAC are used in this process: SMACs are recorded as entries in the MAC forwarding table, while DMACs are looked up in the table and matched to the proper port to send the packet to. Such bridges are called "self-learning bridges" since the MAC forwarding table is built automatically by snooping SMACs of received packets. This is illustrated with an example in FIG. 3, as discussed further below.

Figure 3:
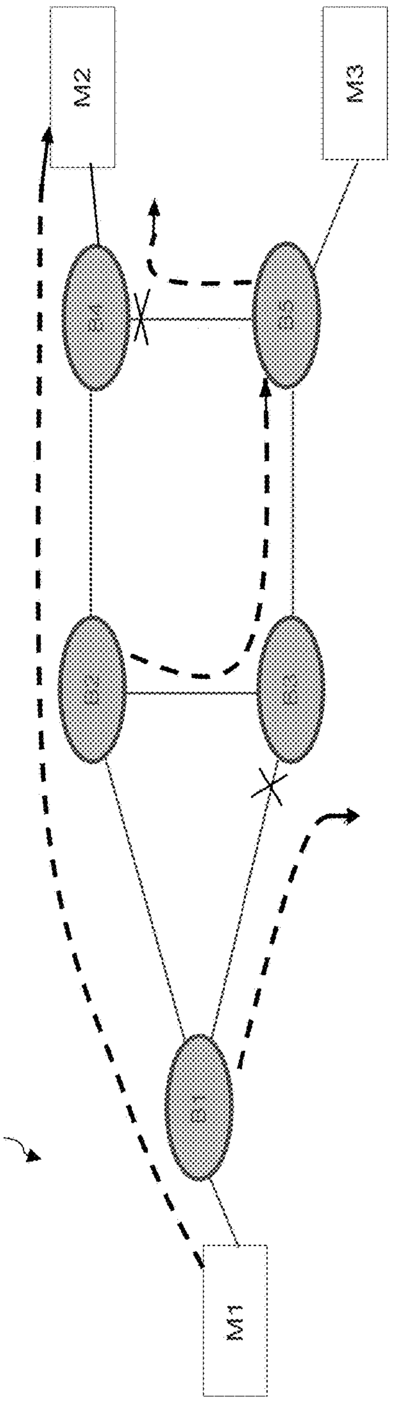
FIG. 3 depicts an example embodiment of a communication system including an Ethernet network.

FIG. 3 depicts an example embodiment of a communication system including an Ethernet network.

In FIG. 3, communication system 300 is similar to communication system 100 of FIG. 1 including the hosts the bridges of the communication system 100 of FIG. 1. As evident, the Ethernet network of bridges has redundant paths for resiliency, which will cause loops for flooded Ethernet packets. To avoid loops in packet forwarding paths, traditional Ethernet networks deploy Spanning Tree Protocol (STP) and its variants like rapid spanning tree protocol (RSTP), multiple spanning tree protocol (MSTP), or the like. Herein, for purposes of clarity, the generic term "STP" is used for all such loop resolution protocols used in traditional Ethernet bridging. STP builds a loop-free logical topology for Ethernet networks, which is a spanning tree and the basic function is to prevent loops and the broadcast radiation that results from such loops. The STP also allows a network design to include backup links providing fault tolerance if an active link fails. For example, in FIG. 2, STP is enabled on all interconnecting links among B1-B5. As a result, B3 blocks the link B1-B3, which means it will neither forward nor receive packets on this link. STP will trigger B3 to activate this link when link B1-B2 fails or B2 itself fails. In the same way, B4 blocks the link B4-B5. As a result, we can see a loop free logical topology (a tree) interconnecting B1-B5. This is illustrated with an example in FIG. 3, as discussed further below.

In FIG. 3, assume that the source host M1 bearing MAC address M1 sends an Ethernet packet to a destination host M2 bearing MAC address M2. The packet is received by B1 and it adds the entry for M1 into the MAC forwarding table with B1->M1 link as the forwarding port. At this point the MAC forwarding table in B1 is as shown in FIG. 4. There is a special entry, the "Flood" entry, which is used to lookup the list of egress ports for any packets to be flooded. B1 does not find any entry for M2 in the table, so B1 floods the packet on all links except the incoming link B1->M1, i.e., on B1->B2 and B1->B3. B3 drops the copy of the packet it receives on B1->B3, as the link is blocked by STP. Similarly, the other bridges flood the packet and a copy eventually reaches M2. From the packet, the bridges B1-B5 learned about M1 and installed its entry in their respective MAC forwarding tables in a manner similar to FIG. 4 for bridge B1. Now, if M2 sends an Ethernet packet to M1, then the bridges will forward (unicast) the packet to its designated port based on the entry for M1 in their MAC forwarding tables. From this packet, the bridges have also learned about M2 and installed its entry in their respective MAC forwarding tables. The updated MAC forwarding table in B1 is shown in FIG. 5. The next time, when M1 sends a packet to M2, there will not be any flooding since an entry for M2 exists in MAC forwarding tables in all bridges.

It will be appreciated that, typically, a bridge uses a mechanism called "aging" to keep the MAC forwarding table current. For each MAC address in the MAC forwarding table, the bridge records a timestamp of when the MAC address was learned. Each time the switch detects traffic from a MAC address that is in its MAC forwarding table, it updates the timestamp of that MAC address. A timer on the bridge periodically checks the timestamp and, if the MAC address is older than the configured maximum aging time, the bridge removes that MAC address from the MAC forwarding table. This aging process ensures that the bridge tracks only active MAC addresses on the network and that it is able to purge from the MAC forwarding table the MAC addresses that are no longer available.

In FIG. 3, if M2 voluntarily populates its MAC addresses periodically in the MAC forwarding tables of the bridges in the network (e.g., since learned MAC addresses age out in the MAC forwarding tables of the bridges in the network) then there would be no need of flooding any packets sent to M2. Flooding of packets wastes bandwidth and other precious resources in the network. When M1 sends the first packet to M2, the MAC forwarding tables would already have the entry to M2 and, thus, the packet would be unicasted to M2. M2 may use GARP or MMRP to voluntarily populate its MAC address across the network. In FIG. 3, assume that the link B1-B2 failed and, as a result, the loop resolution protocol (e.g., STP or the like) activates the backup link B1-B3. So, communication between M1 and M2 can continue via the B1-B3 link. However, until M1 is relearned via the B1-B3 link, the MAC forwarding tables at the bridges continue forwarding the packets to M1 via the old path that traverses B1-B2. It may be possible that during the failure there was no traffic from M1 to any other hosts across the network. As a result, all packets sent to M1 eventually reach B1. Due to failure of B1-B2, the entry of M1 was removed by B1 from its MAC forwarding table, so B1 floods the packets. For example, assume that M3 was sending packets to M1 during the failure, which were following the path B5->B3->B2->B1. When these packets arrive at B3, then B3 forwards the packets to B2. B2 further floods the packets on B2->B4. B2 will not flood on B2->B3 since it was the port of arrival. B4 further floods the packets to M2 and so the packets are blackholed.

In FIG. 3, in order to prevent blackholing of packets after network reconvergence, B1 may use MMRP to purge all of the MAC addresses behind it (e.g., M1) from the MAC forwarding tables across the network. It will be appreciated that MMRP is an Ethernet layer based control protocol identified by Ethertype value 0x88F6. If B1 is using MMRP then, when the B1-B2 link failed, B1 would have sent MMRP messages across all its links, i.e., B1->B3, where the MMRP messages include all MAC addresses to be purged. On receipt of an MMRP message, B3 purges the MAC addresses listed in the message from its MAC forwarding tables. B3 then further propagates the MMRP messages to its neighboring bridges. Eventually, the MMRP messages are seen by every bridge in the network, which results in purging the of the MAC addresses. Once the affected MAC addresses are purged, then packets destined to those MAC addresses will be flooded by every bridge. As a result, a copy of the flooded packet would be sent over the B3->B1 link and the packet would reach its destination.

In FIG. 3, hosts M2 and M3 may initiate IGMP or MLD join or prune messages for adding or deleting its membership in an IP multicast group address. The IGMP/MLD messages are flooded across the Ethernet network which reaches every other host in the network, such as M1. It is noted that IGMP and MLD are IP-based protocols. Now, assume that M2 and M3 have sent IGMP or MLD join message for an IP multicast group denoted as IP-G1. A host (e.g., M1) that intends to send an IP packet to IP-G1 (with the destination address in IP header as IP-G1) first maps the IP-G1 to a multicast MAC address. Then, the host encodes the multicast MAC address in the DMAC field in the Ethernet header that encapsulates the IP packet and forwards the Ethernet packet to the Ethernet network. The default forwarding behavior in a bridge for an Ethernet packet with multicast MAC address is flooding. Eventually, the flooded packet is received by every other host in the network. A host evaluates the DMAC of the received packet to check if it is member of the IP multicast group mapped to the DMAC. If not, then the host drops the packet, otherwise the host accepts the packet for further processing. However, flooding of an IP multicast packet across the Ethernet network generally is not optimal since not every host is interested in the packet. For optimal (or at least improved) forwarding of IP multicast packets, some bridges snoop IGMP or MLD messages in the Ethernet packets received from a port. Based on the IP multicast group address encoded in an IGMP or MLD message, the bridge installs the mapped multicast MAC address in the MAC forwarding table. The port on which the IGMP or MLD message is received becomes the forwarding port for the multicast MAC address. A bridge may receive IGMP or MLD joins for a multicast group from multiple ports. By IGMP or MLD snooping, bridges in an Ethernet network automatically build an any source multicast (ASM) tree across the network for a multicast group. However, IGMP or MLD snooping is problematic because IGMP or MLD snooping is costly in Ethernet bridges (since it requires the Ethernet bridges to implement IP as well as IGMP and MLD) and generally is considered to be a cross-layer violation since Ethernet bridges typically are supposed to operate in the Ethernet layer alone.

It will be appreciated that various aspects of Ethernet networks may be further understood by considering various types of Ethernet networks, such as bridged networks (BNs), provider bridged networks (PBNs), provider backbone bridged networks (PBBNs), or the like.

Various example embodiments for support of MAC address registration may be configured to support MAC address registration in an Ethernet network implemented as a bridged network, and may be further understood by first considering various aspects of bridged networks.

Ethernet networks allow multiplexing of packets from multiple Local Area Networks (LANs) over shared links and devices (bridges, switches). Virtual Local Area Network (VLAN) tags keep traffic from different LANs separated while traversing those shared links and devices. A VLAN tag in a packet identifies the LAN to which the packet belongs.

IEEE 802.1q is the networking standard that introduced the system of VLAN tagging and accompanying procedures to be used by bridges and switches in handling such packets. A VLAN tag which is encoded in a header is often referred to as an “802.1Q tag” or a “dot1q tag”.

Figure 6:
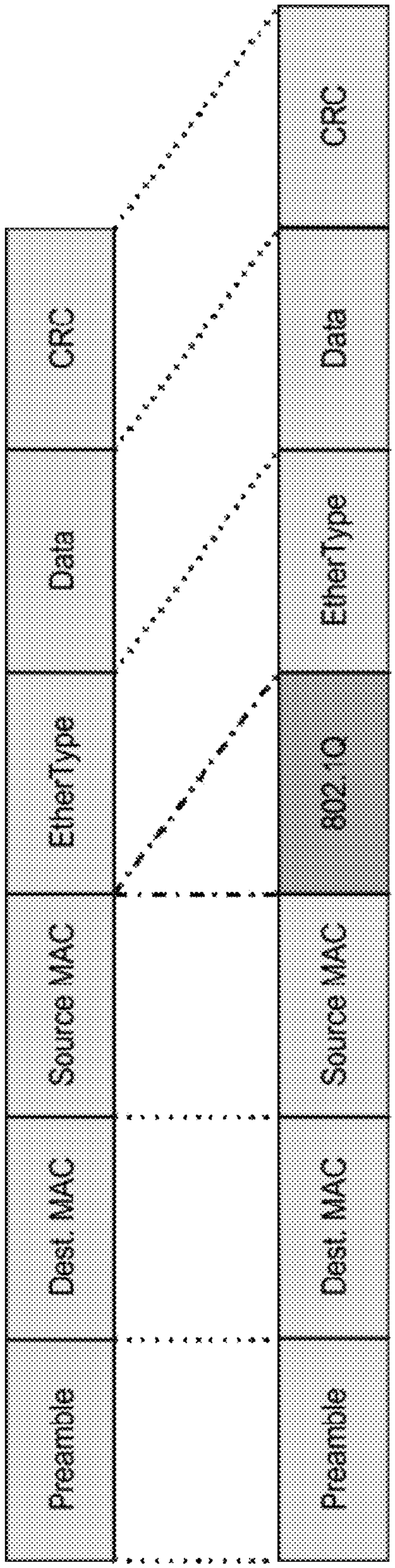
FIG. 6 depicts an example embodiment of an insertion of an 802.1Q tag into an Ethernet packet.

FIG. 6 depicts an example embodiment of an insertion of an 802.1Q tag into an Ethernet packet. As depicted in FIG. 6, an 802.1Q tag is a 32-bit field inserted between the source MAC address and the EtherType fields of the original Ethernet packet.

Figure 7:
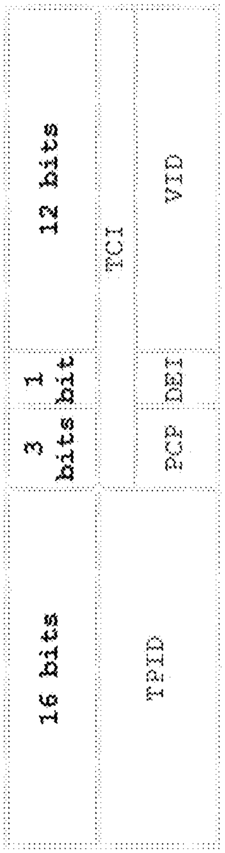
FIG. 7 depicts an example embodiment of the format of an 802.1Q tag which may be inserted into an Ethernet packet.

FIG. 7 depicts an example embodiment of the format of an 802.1Q tag which may be inserted into an Ethernet packet. As depicted in FIG. 7, within the 802.1Q tag, two bytes are used for the tag protocol identifier (TPID) field and the two bytes are used for tag control information (TCI) field where the TCI field is further divided into a Priority Code Point (PCP) field, a Drop Eligibility Indicator (DEI) field, and a VLAN Identifier (VID) field.

The TPID field is a 16-bit field set to a value of 0x8100 in order to identify the frame as an 802.1Q tagged frame. This field is located at the same position as the EtherType field in untagged frames and, thus, may be used to distinguish the frame from untagged frames.

The TCI field is a 16-bit field which, as indicated above, includes the PCP, DEI, and VID sub-field.

The PCP field is a 3-bit field which refers to the class of service and maps to the frame priority level. Different PCP values can be used to prioritize different classes of traffic.

The DEI field is a 1-bit field which may be used separately or in conjunction with PCP to indicate frames eligible to be dropped in the presence of congestion.

The VID field is a 12-bit field specifying the VLAN to which the frame belongs. The hexadecimal values of 0x000 and 0xFFF are reserved. All other values may be used as VLAN identifiers, allowing up to 4,094 VLANs. The reserved value 0x000 indicates that the frame does not carry a VLAN ID; in this case, the 802.1Q tag specifies only a priority (in PCP and DEI fields) and is referred to as a priority tag. On bridges, VID 0x001 (the default VLAN ID) is often reserved for a network management VLAN; this is vendor-specific. The VID value 0xFFF is reserved for implementation use; it must not be configured or transmitted. 0xFFF can be used to indicate a wildcard match in management operations or filtering database entries.

Figure 8:
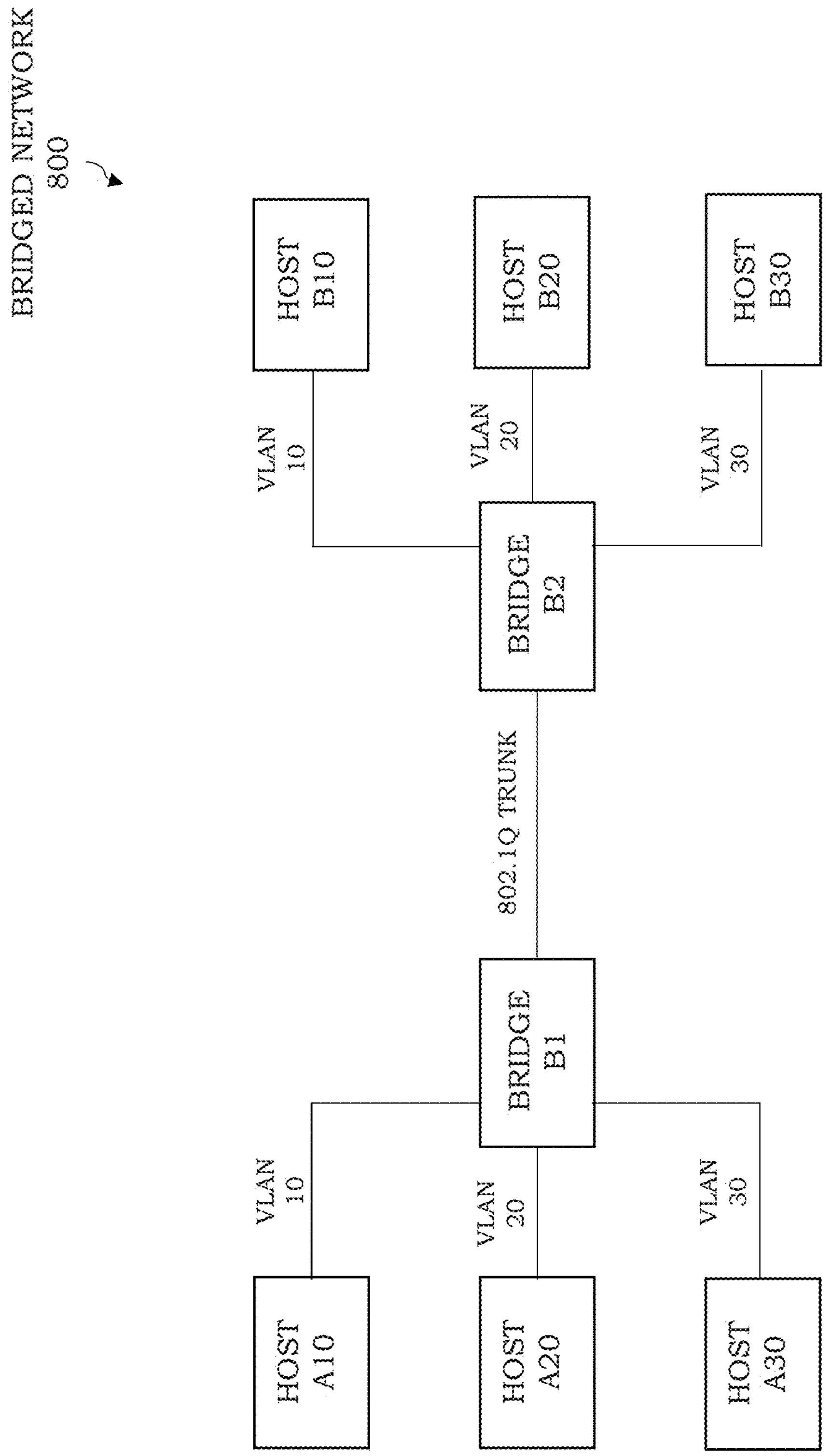
FIG. 8 depicts an example embodiment of a communication system including bridging network (BN) which may be configured to support various example embodiments of MAC address registration.

FIG. 8 depicts an example embodiment of a communication system including a bridged network (BN) which may be configured to support various example embodiments of MAC address registration. In the BN 800, Ax and Bx are host devices in LAN x. For example, A10 and B10 are hosts in LAN 10 interconnected by the bridges B1 and B2, A20 and B20 are hosts in LAN 20 interconnected by bridges B1 and B2, and A30 and B30 are hosts in LAN 30 interconnected by bridges B1 and B2. The link between B1 and B2 is shared by all LANs, which is called a trunk link. So B1 and B2 maintain separate MAC forwarding tables for each VLAN. So, when a packet from LAN x traverses the trunk link, an 802.1Q header is inserted into the packet with VID x, wherein VID x is assigned for LAN x. For example, when A10 sends a packet to B10, A10 sends the packet to B1 via the access link A10-B1. When B1 receives the packet, B1 first learns the source MAC address in the packet and installs it into MAC forwarding table for VLAN 10 and B1 then looks up the destination MAC address of the packet in MAC forwarding table of VLAN 10 and decides to forward the packet on B1-B2 link. B1 inserts the 802.1Q header with VID 10 into the packet and sends the packet to B2. When B2 receives the packet, B2 learns the source MAC address, looks up the destination MAC address of the packet in the MAC forwarding table of VLAN 10, and decides to forward the packet on the access link B2-B10. So, B2 strips the 802.1Q tag and forwards the packet to B10. Since the VID is encoded in 12-bits, so it allows up to 4096 VLANs; however, since VID 0 and VID 0xFFF are reserved for special use, an 802.1Q network supports aggregation of up to aggregation 4094 VLANs.

As an example, consider the network in FIG. 3 as a bridged network that aggregates traffic from multiple VLANs. For example, assume that M1, M2 and M3 are the hosts in VLAN 100 and consider the case of a failure of link B1-B2. In that case, all MAC addresses learned from the B1-B2 link on each VLAN need to be purged from the bridges. Herein, the bridge B1 would issue a Multiple VLAN Registration Protocol (MVRP) message for each VLAN on the B1->B2 link indicating "purge MACs learned from all links except me" and send the MVRP message on the newly activated B1->B3 link. When a MVRP message is received by B3 then it purges all MACs in the MAC forwarding table for the VLAN, except the ones learned from B1->B3 link. For example, the MVRP message for VLAN 100 would make B3 delete the entry for M1 from MAC forwarding table since M1 was learned from the B2->B3 link. B3 further propagates the MVRP messages to each neighbor. As evident, here more MAC entries than the required ones gets purged. Alternately, B2 may issue MMRP messages for each VLAN listing the MAC addresses learned from B1->B2 link to be purged. If the number of MAC addresses in a VLAN are large then it may not be scalable approach and so MVRP based purging would be the optimal solution. By using MMRP or GARP, a bridge in an 802.1q network can voluntarily populate its MAC address across the network in the context of a VLAN. A bridge in the customer domain can voluntarily populate its MAC address as well. A bridge in an 802.1Q network may also perform IGMP or MLD snooping of packets received on VLAN to build forwarding states for multicast MAC addresses in the MAC forwarding table for a VLAN.

Various example embodiments for support MAC address registration may be configured to support MAC address registration in an Ethernet network implemented as a provider bridged network (PBN), and may be further understood by first considering various aspects of PBNs.

IEEE 802.1ad was the next evolution of VLAN tagging, which is also known as "Q-in-Q" where Q-in-Q refers to doubling up of 802.1Q tags. It is also known as VLAN stacking or double tagging. This approach enabled PBNs by service providers (SPs) to offer transparent LAN services that preserve and extend virtual LAN groupings of customers across a MAN or WAN. Q-in-Q enables an SP to use a single VLAN to securely transport VLANs of a customer across the MAN or WAN backbone of the SP.

Figure 9:
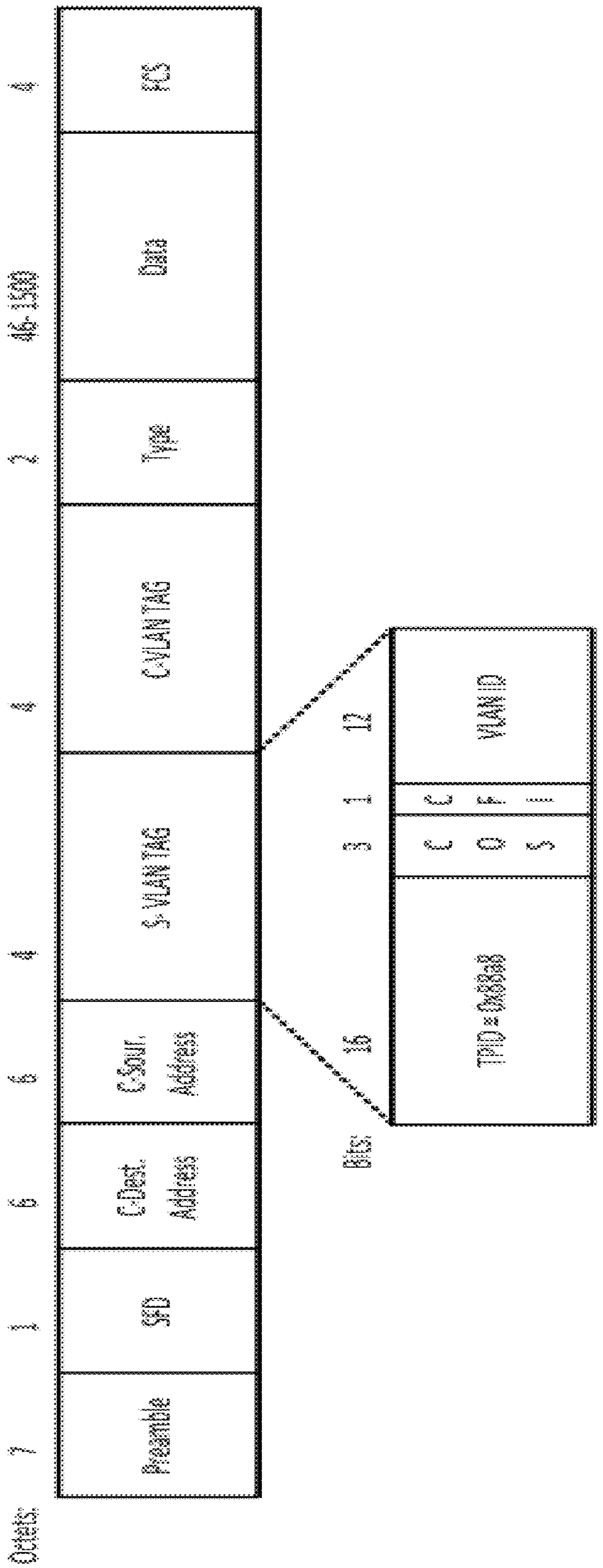
FIG. 9 depicts an example embodiment of the format of an 802.1ad frame including customer and provider Virtual Local Area Network (VLAN) tags.

FIG. 9 depicts an example embodiment of the format of an 802.1ad frame including customer and provider VLAN tags. As depicted in FIG. 9, the SP edge bridge adds an extra 802.1Q header to customer traffic. This tag assigns a unique VID number to each customer to keep the VLAN traffic of each customer segregated and private from the VLAN traffic of other customers. Thus, a single SP VLAN (i.e., S-VLAN) can carry traffic for a maximum of 4094 customer VLANs (C-VLANs). Since the VID field is 12-bits in an 802.1Q VLAN tag, a SP can support a maximum of 4094 customers per SP service instance.

Figure 10:
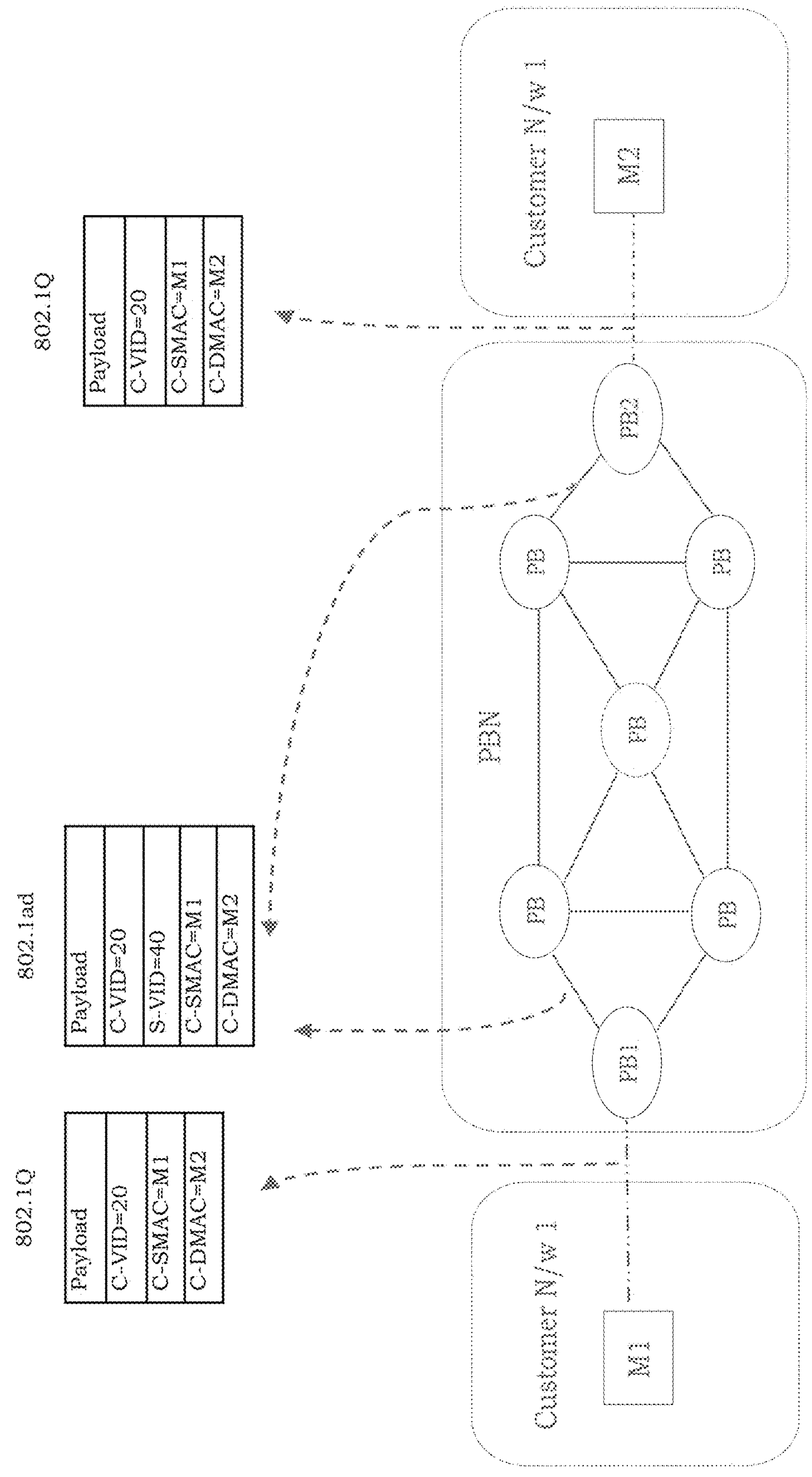
FIG. 10 depicts an example embodiment of a communication system including a provider bridged network (PBN) which may be configured to support various example embodiments of MAC address registration.

FIG. 10 depicts an example embodiment of a communication system including a provider bridged network (PBN) which may be configured to support various example embodiments of MAC address registration. The PBN 1000 is composed of Provider Edge Bridges (denoted as PB1 and PB2) and Provider Core Bridges (denoted as PBs). M1 and M2 are two hosts located in two remote sites of customer network 1 and are configured with MAC addresses M1 and M2 respectively. FIG. 10 illustrates a specific example of transmission of a packet from M1 to M2. The site of M1 is connected to PB1 and the site of M2 is connected to PB2. M1 located within C-VLAN 20 in the customer network 1 originates an Ethernet packet with {C-DMAC=M2, C-SMAC=M1}. Customer network 1 pushes the C-VID 20 into the packet and sends the resultant 802.1q packet with {C-DMAC=M2, C-SMAC=M1, C-VID=20} to the local site of PB1. PB1 assigned S-VLAN 40 to aggregate all packets to/from customer network 1. PB1 learns the C-SMAC from the packet and installs its forwarding state into the MAC forwarding table of S-VLAN 40 (depicted in FIG. 11A). It is noted that each bridge in the PBN maintains a MAC forwarding table per S-VLAN. So, PBN-1 pushes the S-VID 40 into the packet and the resultant 802.1ad packet with {C-DMAC=M2, S-SMAC=M1, S-VID=40, C-VID=20} is forwarded through PBN on S-VLAN 40. Eventually, the packet is received by PB2. PB2 learns the C-SMAC from the packet and installs its forwarding state into the MAC forwarding table of S-VLAN 40 (depicted in FIG. 11B). PB2 finds that M2 is already learned from the link to customer n/w 1, so PB2 removes the S-VID and forwards the resultant 802.1q packet on the link. The packet is eventually received by M2.

As an example, consider the network in FIG. 3 as a PBN where B1, B4, and B5 are the PEBs. Consider the case of a failure of link B1-B2. In that case, MAC addresses learned from the link B1->B2 on all SVLANs need to be purged from the MAC forwarding table of the SVLANs across the network. Here, B2 can either issue MMRP messages for listing the MAC addresses to be purged on each SVLAN or B1 can issue an MVRP message for each SVLAN indicating "purge MACs learned from all links except me". A bridge in PBN may also perform IGMP or MLD snooping of packets received on an S-VLAN to build forwarding states for multicast MAC addresses in the MAC forwarding table for the S-VLAN.

It will be appreciated that, while PBN may provide various advantages or potential advantages, PBN also may have certain limitations. For example, PBNs can support a maximum of 4094 service instances per PBN. For example, while the SP controls its own bridges, the SP also is required to learn all customer end-station MAC addresses. As an SP supports more customers, the increased number of learned MAC addresses typically does not scale according to needs. When the number of entries exceeds the capacity permitted in the MAC forwarding table, the forwarding table overflows and can potentially cause a broadcast storm in the provider network. For example, customer networks cannot be clearly separated from provider networks. A clear demarcation point determines what services are provisioned and how fault and performance management is performed for the services provided.

Various example embodiments for support MAC address registration may be configured to support MAC address registration in an Ethernet network implemented as a provider backbone bridged network (PBBN) based on provider backbone bridging (PBB), and may be further understood by first considering various aspects of PBB and associated PBBNs.

PBB is standardized in IEEE 802.1ah and is used by SPs to resolve various limitations of PBNs. PBB introduced a hierarchical network architecture with associated new frame formats which extend the work completed by PBNs. In PBB architecture, customer networks (using 802.1q bridging) are aggregated into PBNs (using 802.1ad) which, in turn, are aggregated into a PBBN which utilizes the 802.1ah frame format.

Figure 12:
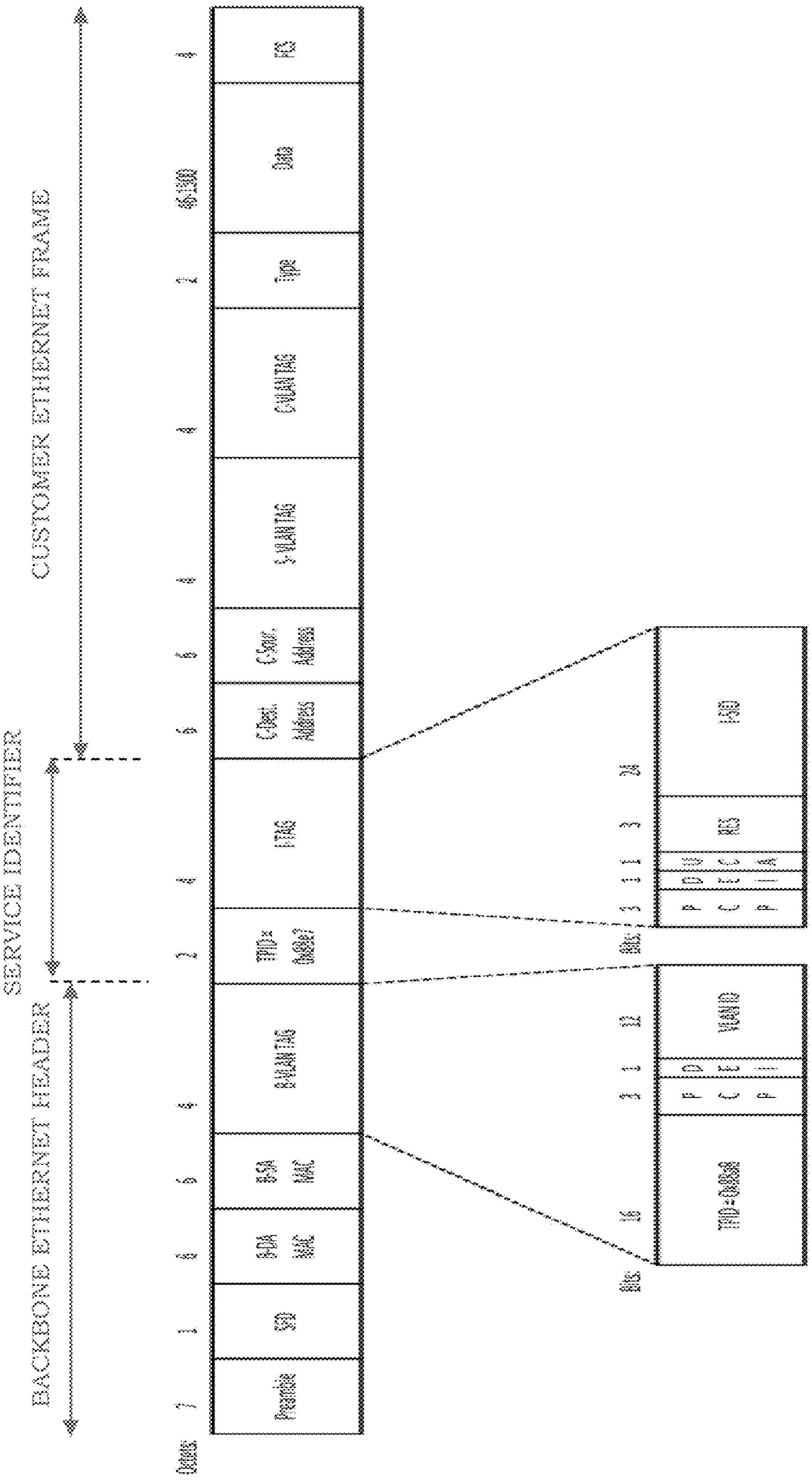
FIG. 12 depicts an example embodiment of a frame format for use in a provider backbone bridging network (PBBN) which may be configured to support various example embodiments of MAC address registration.

FIG. 12 depicts an example embodiment of a frame format for use in a provider backbone bridging network (PBBN) which may be configured to support various example embodiments of MAC address registration. As depicted in FIG. 12, the frame format 1200 employs a MAC tunneling encapsulation scheme (MAC-in-MAC) for tunneling customer Ethernet frames across the PBBN. In FIG. 12, the 802.1ah encapsulation is composed of the backbone Ethernet header and service identifier.

Figure 13:
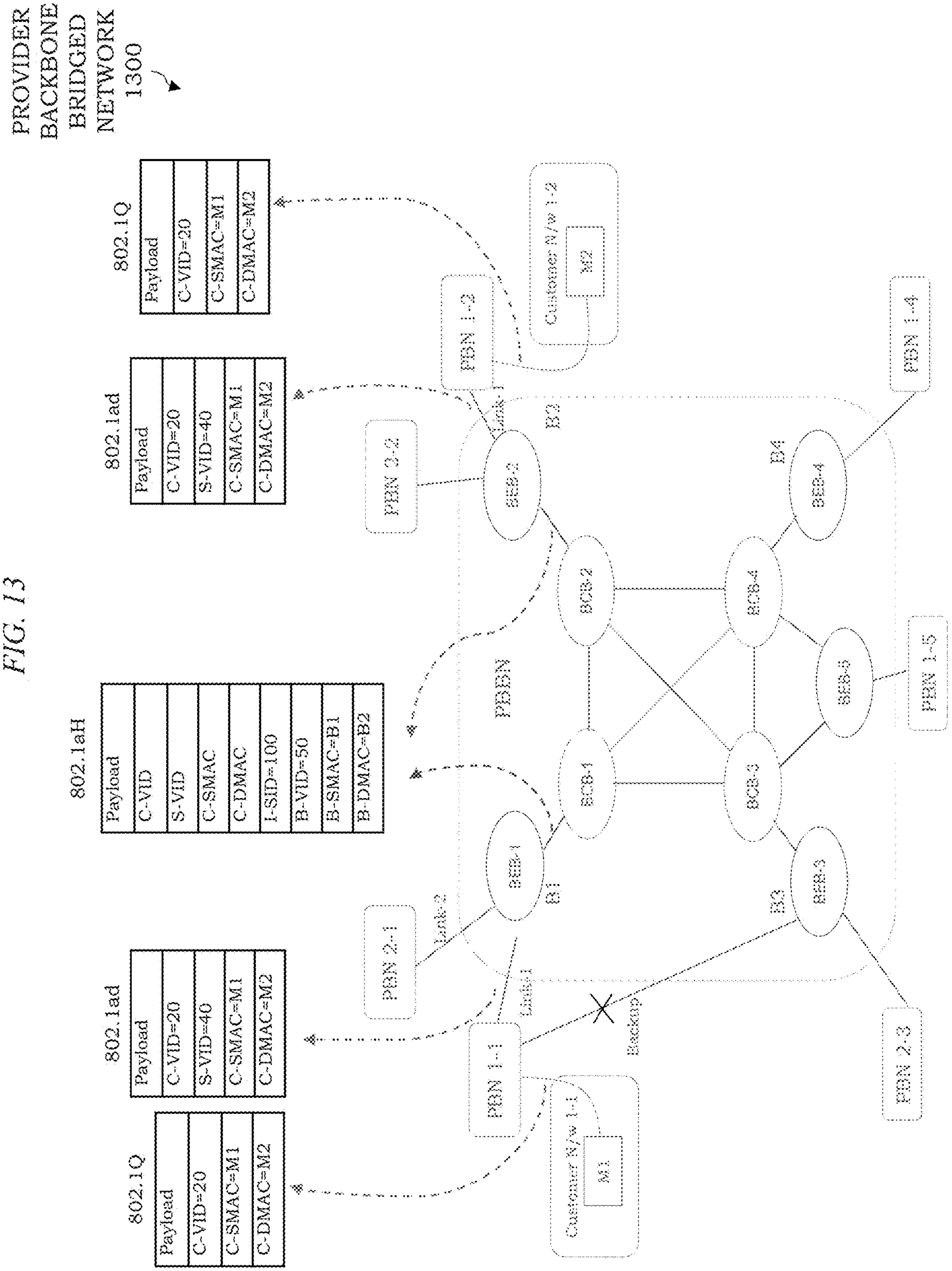
FIG. 13 depicts an example embodiment of a communication system including a provider backbone bridging network (PBBN) which may be configured to support various example embodiments of MAC address registration.

FIG. 13 depicts an example embodiment of a communication system including a provider backbone bridging network (PBBN) which may be configured to support various example embodiments of MAC address registration.

In FIG. 13, the PBBN is composed of Backbone Edge-Bridges (BEBs) and Backbone Core Bridges (BCBs). BEBs are entry points to the PBBN from the PBNs, which encapsulate the customer Ethernet frame (802.1ad frame) with an 802.1ah header. Each BEB is assigned a unique MAC address which is denoted as BMAC, i.e., backbone MAC address. BEB-1, BEB-2, BEB-3, BEB-4, and BEB-5 are assigned BMACs B1, B2, B3, B4, and B5, respectively. The SMAC and DMAC in the backbone Ethernet header are the MAC address of the source BEB (also referred to as a backbone source MAC address (B-SMAC)) and the MAC address of the destination BEB (also referred to as a backbone destination MAC address (B-DMAC)). A VLAN ID (also referred to as a backbone VID (B-VID)) is used to segregate the backbone into independent broadcast domains and a new 24-bit service identifier (I-SID or I-tag) is defined and used to associate a given customer Ethernet frame with a provider service instance (or PBN). With a 24-bit I-SID field, a PBBN can aggregate upto 2^24 provider service instances or PBNs, which removes the limitation in PBN to be able to provide only upto 4094 provider service instances. BEBs only maintain customer specific MAC forwarding tables. A BEB learns C-SMAC from the customer frame received from the PBN and learns the C-SMAC to B-SMAC association from the MAC-in-MAC frame received from another BEB. The BCBs are regular 802.1q-based bridges which forward frames between BEBs based on the backbone Ethernet header alone and are completely agnostic of the customer Ethernet frame as well as the I-SID. So, there is a clear segregation between I-SIDs and B-VIDs which was missing in 802.1ad.

In FIG. 13, an S-VLAN based service interface (i.e., a PBN) to PBBN is presented. One or more S-VLANs in a PBN are treated as a single provider service instance. The BEBs extend the S-VLANs over the backbone by mapping all frames on a single backbone service instance identified by an I-SID. The I-SID that is used is provisioned by the provider of the PBBN. The BEBs preserve the S-VLAN over the backbone by mapping them onto I-SID and, in the case of S-VLAN bundling, carrying the S-VLAN ID. This operation is performed, by the provider operating the PBBN, by configuring the I-SID on a subset of BEBs attached to a PBN, where the subset of BEBs have local connections to member S-VLAN(s). The BEB maps S-VLAN ID to I-SID and encapsulates the original service frame with a new I-TAG, B-SMAC, and B-DMAC. The BEB then maps the frame onto a B-VLAN, which interconnects BEBs. This new frame is transmitted over the B-VLAN by BEBs and BCBs that carry the B-VLAN. Since the initial octets of the data conveyed in each backbone frame comprise a B-VID, the frames may be forwarded by BCBs of the PBBN on the B-VLAN ID, until they reach the next BEB where the frames are decapsulated. During decapsulation, the 802.1ah header is stripped, i.e., the B-DMAC, B-SMAC, B-VID, and I-SID are stripped. The C-DMAC and C-SMAC will become the DA and SA transmitted to the receiving S-VLAN. So, after decapsulation the resultant frame is an 802.1ad frame which is forwarded to the respective PBN. It is noted that various aspect of the network of FIG. 13 may be further understood by considering the following examples of propagation of a packet within the context of the network of FIG. 13.

In a first example of FIG. 13, customer network 1-1 and customer network 1-2 are two remote sites of customer network 1. PBN 1-1, PBN 1-2, PBN 1-4, and PBN 1-5 are remote networks of PBN 1. FIG. 13 illustrates a specific example of transmission from a packet from a host with MAC address M1 in customer network 1-1 to a remote host with MAC address M2 in customer network 1-2. Customer network 1-1 is connected to PBN 1-1 and customer network 1-2 is connected to PBN 1-2. M1 located within C-VLAN 20 in customer network 1 originates an Ethernet packet with {C-DMAC=M2, C-SMAC=M1}. Customer network 1-1 pushes the C-VID 20 into the packet and sends the resultant 802.1q packet with {C-DMAC=M2, C-SMAC=M1, C-VID=20} to PBN 1-1. All networks of PBN 1 assigned S-VLAN 40 to aggregate all packets to/from customer network 1. So, PBN 1-1 pushes the S-VID 40 into the packet and the resultant 802.1ad packet with {C-DMAC=M2, S-SMAC=M1, S-VID=40, C-VID=20} is forwarded to BEB-1 over Link-1.

In the first example of FIG. 13, PBN 1-1 is dual-homed and also has a backup link to BEB-3 to protect against failure of Link-1 or BEB-1. The backup link remains inactive until failure of Link-1 or BEB-1. In BEB-1, the link 1 to PBN 1-1 is mapped as a service instance to I-SID 100. Similarly, in BEB-3, the backup link to PBN 1-1 is mapped as a service instance to I-SID 100. So, packets with any S-VLAN on link 1 or backup link are mapped to I-SID 100 by respective BEBs. On receipt of the exemplary packet, BEB-1 pushes the I-SID 100 onto the received packet. Then, BEB-1 looks up the I-SID forwarding table of I-SID 100 (presented in FIG. 14) for the mapped B-VLAN and the B-DMAC mapped to C-DMAC M2, which results in B-VLAN 50 and B-DMAC B2. BEB-1 pushes the backbone Ethernet header onto the packet with B-SMAC=B1, B-DMAC=B2 and B-VLAN=50, which results in the 802.1ah frame {B-DMAC=B2, B-SMAC=B1, B-VID=50, C-DMAC=M2, C-SMAC=M1, S-VID=40, C-VID=20}. BEB-1 then looks up the forwarding link(s) for B-DMAC in the MAC forwarding table of B-VLAN 50 (presented in FIG. 15). Then BEB-1 forwards the packet to the egress port found from the table. The BCBs forward the packet based on B-DMAC in the MAC Forwarding Table in B-VLAN 50. BCBs maintain a MAC forwarding table per B-VLAN. Eventually the packet reaches BEB-2, which looks up the B-DMAC in the MAC forwarding table of B-VLAN 50 (presented in FIG. 16) and finds that the B-MAC is local (belongs to BEB-2). So, BEB-2 strips the backbone Ethernet header and I-SID. Then, it looks up the C-DMAC M2 in the I-SID forwarding table for I-SID 100 (presented in FIG. 17) and finds Link 1 as the egress port. The resultant 802.1ad frame {C-DMAC=M2, S-SMAC=M1, S-VID=40, C-VID=20} is forwarded on Link 1 to PBN 1-2. The packet eventually reaches host M2 in customer network 1-2.

In the second example in FIG. 13, assume that M1 originates a packet with C-DMAC=broadcast MAC address. So, BEB-1 receives the 802.1ad packet with {C-DMAC=broadcast, S-SMAC=M1, S-VID=40, C-VID=20} from link 1 and pushes I-SID 100 onto the packet. Now, BEB-1 needs to broadcast the packet to all BEBs that are configured for I-SID 100. In that case, the B-DMAC is encoded with an I-SID specific group MAC address. This I-SID specific group MAC address is a special address which is built by concatenating the Provider Backbone Bridge Organizationally Unique Identifier (OUI) (0x00:0x1E:0x83) with the I-SID value. The 802.1ah packet is flooded by BEBs and BCBs across the B-VLAN 50 since there is no forwarding state for this special group MAC address in the MAC forwarding table of the B-VLAN 50. Eventually, a copy of the packet is received by all BEBs configured with B-VLAN 50. Now, assume that all BEBs participate in B-VLAN 50. So BEB-2, BEB-3, BEB-4 and BEB-5 each receive a copy of the packet. The BEBs that are not configured with I-SID 100, such as BEB-3, drop the packet after reading the I-SID value in the B-DMAC. The unlearned unicast packets are broadcasted by a BEB the same way as the transmission of broadcast packet.

In a third example in FIG. 13, assume that the Link-1 that connects PBN 1-1 to BEB-1 has failed, so the backup link to BEB-3 is activated so that PBN 1-1 remains connected to the PBBN to send and receive traffic. Any packet sent from M2 to M1 now needs to be sent by BEB-2 to BEB-3 instead of BEB-1. However, the I-SID forwarding table in BEB-2 for I-SID 100 (presented in FIG. 17) has the association of M1 to BEB-1. So, until any traffic from M1 via BEB-3 is received by BEB-2 which would make BEB-2 change the association of M1 to BEB-3, any traffic to M1 would be blackholed. This applies to all other BEBs that would send packets to M1. It may be possible that, during the failure, M1 was inactive and no traffic was sent by M1 via PBBN. In that case, packets to M1 and any other hosts behind PBN 1-1 remain blackholed in the network. In order to circumvent the dropping of traffic when Link-1 between PBN 1-1 and BEB-1 fails (or BEB-1 itself fails), BEB-3 performs two tasks upon activation of backup link: BEB-3 purges its own MAC address table for the I-SID 100 and initiates a Multiple I-SID Registration Protocol (MIRP) message for I-SID 100. MIRP provides the ability to purge learned MAC address entries in the MAC forwarding table of an I-SID. MIRP defines mechanisms for purging MAC addresses for an I-SID, and has the required capabilities to handle topology changes that occur in networks attached to a PBBN. A BEB signals, to other potentially effected BEBs, the need to alter certain learned associations between C-MACs and B-MACs. The MIRP message is encapsulated as an 802.1ah packet. In the example, BEB-3 broadcasts the 802.1ah encapsulated MIRP message to all BEBs using the I-SID specific group MAC address as the B-DMAC. The MIRP message requests the remote PE that receives the MIRP message to purge all MAC addresses of its own MAC forwarding table for I-SID 100. Since the MIRP message is encapsulated as an 802.1ah packet, it is transparent to the BCBs. It is noted that (1) a BEB can voluntarily populate its BMAC across the backbone in the context of a B-VLAN, using MMRP or GARP, (2) a BEB can also populate a CMAC address in the MAC forwarding table of an I-SID using the same protocols, and (3) using the same protocols, a customer domain can also initiate population of MAC address across the customer network, which in turn gets populated into the MAC forwarding table of the I-SID allocated for the customer. The voluntary population of a BMAC across the backbone in the context of a B-VLAN eliminates flooding of unlearned unicast packets destinated to the BMAC, if no customer traffic is being sent through the BMAC (i.e., its BEB) to the PBBN. The voluntary population of a CMAC by a BEB across the MAC forwarding tables for an I-SID in other BEBs eliminates flooding of unlearned unicast packets destinated to the CMAC, if no customer traffic is being originated from the CMAC. A BEB network may also perform IGMP or MLD snooping of packets received on an I-SID to build forwarding states for multicast C-MAC addresses in the MAC forwarding table for the I-SID.

It will be appreciated that use of a PBBN may have various benefits. For example, the use of a PBBN may be beneficial in that it imposes no change to the Ethernet switching process in the core bridges, provides a clear demarcation point between the customer and provider domain, learns customer MAC addresses only through the BEBs, and supports up to 2^24 service instances. For example, the use of a PBBN may be beneficial in that the PBB approach limits the scope of the customer information, MAC addressing, and topology to the edges of the service provider network, thereby enabling core remains focused on core functions and not on customer awareness.

Various example embodiments presented herein may be configured to provide a simple and generic method for MAC address registration in Ethernet networks which operates in-band with the Ethernet data plane and which is protocol independent, thereby supporting efficient and reliable MAC address registration in Ethernet networks and, thus, significantly improving traffic convergence in Ethernet networks. First, for example, for purposes of MAC address registration, Ethernet networks typically employ various control protocols, such as GARP, MMRP, MVRP, MIRP, and so forth, where certain control protocols are applicable only in a specific dataplane context (e.g., MIRP is applicable only in PBBN). Second, for example, there are various vendor specific control protocols implemented by Ethernet bridges that support MAC address registration. Third, for example, to minimize cost and complexity, there are many Ethernet bridges that do not support such control protocols at all and, thus, that are unable to offer optimal convergence times on topology changes (e.g., using various types of MAC purge operations) or eliminates flooding of unlearned unicast packet (e.g., using various types of MAC populate operations). Fourth, for example, to minimize cost and complexity, there are many Ethernet bridges that do not support IGMP or MLD snooping at all and, thus, that are unable to offer optimal forwarding of multicast packets across an Ethernet network. When a network is built with a mix of such varieties of bridges, MAC address registration generally is not possible due to lack of a unified method and, thus, convergence of traffic may be significantly impacted. Various example embodiments presented herein may be configured to obviate a need for all of the Ethernet bridges in a network to support all such protocols in order to support seamless MAC address registration. Various example embodiments presented herein may be configured to enable an Ethernet network that supports a combination of such Ethernet bridges to support efficient and reliable MAC address registration in Ethernet networks and, thus, significantly improve traffic convergence in Ethernet networks.

Various example embodiments presented herein are configured to support in-band MAC address registration in Ethernet networks. Various example embodiments for in-band MAC address registration in Ethernet networks are configured to provide a protocol-independent MAC address registration capability that can operate in-band within the dataplane in a manner that is generic and seamlessly applicable to any dataplane context. Various example embodiments presented herein may be configured to provide a simple and generic method for MAC address registration in Ethernet networks which operates in-band within the Ethernet data plane and which is protocol independent, thereby supporting efficient and reliable MAC address registration in Ethernet networks and, thus, significantly improving traffic convergence in Ethernet networks. It is noted that herein, unless indicated otherwise, the term "registration" when discussing a MAC address registration operation primarily means population or purging of one or more MAC addresses in one or more MAC forwarding tables of a specific context and the term "in-band" used for describing a MAC address registration operation primarily means that the MAC address registration operation is performed using fields in the data plane header (e.g., in the case of Ethernet networks, the data plane header is the Ethernet Header and the fields used to provide the MAC address registration operation are the DMAC and SMAC address fields as discussed above) alone (i.e., without using any fields of an upper layer header of a control protocol, such as Internet Group Management Protocol (IGMP), Multicast Listener Discovery (MLD), Generic Attribute Registration Protocol (GARP), Multiple MAC Registration Protocol (MMRP), or other types of control protocols). It is noted that herein, unless indicated otherwise, an in-band MAC address registration operation uses the dataplane header (namely, the Ethernet header) alone and the in-band MAC address registration operation modifies the MAC forwarding table that is used by the Ethernet bridge for forwarding data packets.

Various example embodiments for in-band MAC address registration in Ethernet networks may be configured to support in-band MAC address registration based on sending of a MAC address registration message as an Ethernet header where the DMAC field is configured to indicate that the Ethernet header is being used as a MAC address registration message (e.g., using a special value in the DMAC field) and the SMAC field indicates the MAC address(es) for which a MAC address operation is to be performed (e.g., the SMAC field includes a MAC address or a special value). Six special multicast MAC addresses are defined and are collectively referred to as MAC Registration Group (MRG) Addresses or, more simply, as MRGs. An MRG is encoded as a DMAC in an Ethernet header and when a bridge receives an Ethernet header with a MRG as DMAC, the bridge identifies the Ethernet header as a MAC address registration message. The SMAC of the MAC address registration message is encoded as follows: (1) if a specific MAC address is to be registered with a MAC forwarding table then that MAC address is encoded in the SMAC and (2) if all MAC addresses in a MAC forwarding table need to be purged then the SMAC is encoded as all zeroes (which may be referred to herein as "wildcard" MAC purging). A bridge that receives a MAC address registration message will not use the SMAC for learning action. Since there is no payload per se in the MAC address registration message, the Ethertype field after the context specific headers (if any) encapsulated by the Ethernet Header is encoded with 0 to indicate the absence of payload or no upper layer protocol. It is noted that any Ethertype value less than 1500 is treated as the Length field. For example, if the MAC address registration message is sent in the context of 802.1ad then Ethertype immediately after the Ethernet Header encodes 0x8100 to indicate the presence of S-VLAN header (S-VID), the Ethertype after the S-VID encodes 0x8100 to indicate the presence of C-VLAN header (C-VID), and the Ethertype after the C-VID is encoded as 0 since no payload or upper layer protocol is associated with the packet. For example, if the MAC address registration message is sent in the context of I-SID in 802.1ah then the context encapsulations are: (1) S-VID and C-VID encapsulated by the Ethernet header and (2) I-SID encapsulates the Ethernet header (i.e., this context header is not encapsulated by the Ethernet header).

The MAC forwarding table(s) to be acted upon by MAC address registration message is identified based on the dataplane "context" of the MAC address registration message. For example, if the MAC address registration message is an untagged packet then all the MAC forwarding tables associated with the received port are the ones to be acted upon. For example, if the MAC address registration message is an 802.1q tagged packet then the MAC forwarding table for the VID is the one to be acted upon. For example, if the MAC address registration message is an 802.1ad packet then the MAC forwarding table for the S-VID is the one to be acted upon. For example, if the MAC address registration message is an 802.1ah packet then the MAC forwarding table for the I-SID is the one to be acted upon. Additionally, when a MAC address registration message is sent on an Ethernet network hierarchy such as 802.1q, 802.1ad, 802.1ah, or the like, then a bridge terminating a hierarchy must know whether the MAC address registration message is to be propagated to the upper hierarchy. For example, in 802.1ad network, a provider edge bridge that strips the S-VID before forwarding the C-VID tagged packet to a customer network must know if a received MAC address registration message needs to be propagated to the customer network. Typically the propagation is necessary if the packet was originated by a bridge in a remote site of the customer network. Similarly, in 802.1ah network, if a BEB receives a MAC address registration message within an I-SID from the packet received from the backbone then the BEB needs to know if the MAC address registration message needs to be forwarded to the customer network. Typically the propagation is necessary if the packet was originated by a bridge in a remote site of the customer network associated with the I-SID. Whether a MAC address registration message is to be propagated to the upper hierarchy is indicated by the value of MRG.

FIG. 18 depicts a matrix illustrating the six types of MRGs which may be used as DMACs in MAC address registration messages for controlling MAC address registration operations.

In FIG. 18, the three types of operations include a MAC populate operation, a positive MAC purge operation, and a negative MAC purge operation. Each of the three operations can be performed without (No Propagate) or with (Propagate) propagation of the MAC address registration message to the upper hierarchy. The "No Propagate" column indicates the MRGs to be used as DMACs by MAC address registration messages in hierarchical networks wherein the packets are not propagated to upper hierarchy. The "Propagate" column indicates the MRGs to be used as DMACs by MAC address registration messages in hierarchical networks wherein the packets are propagated to upper hierarchy. The propagation option may be particularly important for a number of reasons. One situation in which the propagation option may be important is when a bridge operating in a lower hierarchy, when initiating registration of a MAC address in an upper hierarchy, does not want the bridge that terminates the lower hierarchy to propagate the MAC address registration to the upper hierarchy. For example, a bridge in an 802.1ad network may initiate registration of a MAC address across the network, but does not want to propagate the registration into the customer domain. In that case, an edge bridge receives the registration packet, performs the required action, and then strips the S-VID before forwarding into customer domain (in the context of C-VID). If the DMAC indicates no propagation then the packet is not forwarded to customer domain, and such would be the case for MAC purge operations due to topology changes in S-VLAN. Similarly, for example, the BEB in an 802.1ah network can initiate MAC address registration within an I-SID, but does not want the registration to be propagated to the customer domain by the receiving bridges. Another situation in which the propagation option may be important is for Operation, Administration, and Maintenance (OAM) packets. For example, since OAM operations may be strictly within the lowermost hierarchy, the propagation option may be used to ensure that MAC address registration messages originated for OAM are not be passed on the upper hierarchy by the bridges that terminate the lowermost hierarchy. It will be appreciated that the propagation option may be used in various other ways, may be important in various other contexts, or the like, as well as various combinations thereof.

As indicated above, MAC Populate, Positive MAC Purge, and Negative MAC Purge are various types of MAC address registration messages. Each of these types are assigned two MRGs to be used as DMACs—one for the No Propagate option and one for the Propagate option.

A MAC Populate packet is used to install a MAC address into the MAC forwarding tables of the "context" associated with the packet. Here, the "context" of a MAC address registration message means the forwarding context, such as S-VLAN, C-VLAN, I-SID, or the like. The SMAC of a MAC Populate packet encodes the MAC address to be installed. The DMAC encodes MRG-ADD if there is no hierarchy in the context associated with the MAC Populate packet or propagation of the packet to an upper hierarchy is not required. The DMAC encodes MRG-ADD-PROP if the MAC Populate packet needs to be propagated to the upper hierarchy.

A Positive MAC Purge packet purges one or all MAC addresses from the MAC forwarding table of a receiver of the packet, except the MAC addresses learned from the sender. Note that, here, the "sender" of the packet is not the originator of the packet, but, rather, is a neighbor or a link in the context associated with the packet. For example, in the context of MAC purge within an I-SID in a BEB, the sender of the packet could be the remote BEB that sent the packet. If a specific MAC address is to be purged then the SMAC encodes that address. If all MAC addresses are to be purged then the SMAC encodes special value (e.g., "0" or other suitable value), which is called "wildcard" purge. The DMAC encodes MRG-DEL-POS if there is no hierarchy in the context associated with the packet or propagation of the packet to an upper hierarchy is not required. The DMAC encodes MRG-DEL-POS-PROP if the packet needs to be propagated to the upper hierarchy.

A Negative MAC Purge packet purges one or all MAC addresses from the MAC forwarding table of a receiver of the packet, which were learned from the sender. Note that, here, the "sender" of the packet is not the originator of the packet, but, rather, is the neighbor or a link in the context associated with the packet. If a specific MAC address learned from the neighbor is to be purged then the SMAC encodes that address. If all MAC addresses learned from the neighbor are to be purged then the SMAC encodes a special value (e.g., "0" or other suitable value). The DMAC encodes MRG-DEL-NEG if there is no hierarchy in the context associated with the packet or propagation of the packet to an upper hierarchy is not required. The DMAC encodes MRG-DEL-NEG-PROP if the packet needs to be propagated to the upper hierarchy.

It will be appreciated that, although primarily described with respect to use of in-band address registration for address registration operations (e.g., in-band MAC address registration for MAC address registration operations in Ethernet-based communication systems using the Ethernet header, in-band IP address registration for IP address registration operations IP-based communications systems using the IP header, or the like), in-band MAC address registration may be used as an alternative to IGMP or MLD snooping for building multicast trees in an Ethernet network. The Ethernet header that carries an IGMP or MLD join packet may be encoded by the originating host with DMAC as MRG-ADD-PROP and SMAC as the multicast MAC address mapped from the IP multicast group address in the IGMP or MLD packet. It is noted that this is a case of MAC address registration where the MAC address registration message is a packet that includes an Ethernet Header and an associated payload such as IP and IGMP/MLD. In such cases, the Ethertype field after the context specific encapsulation(s) (if any) after the Ethernet header is encoded to indicate the upper layer protocol (e.g., IP for IGMP or MLD packets). In this case, when an Ethernet bridge receives the IGMP or MLD join packet, the Ethernet bridge finds the MRG-ADD- PROP address in the DMAC field so the Ethernet bridge installs the multicast MAC address in SMAC field into the MAC forwarding table of the lowermost context associated with the packet, which results in installation of a multicast MAC address with the receiving port of the packet as the forwarding port. The bridge may receive an IGMP or MLD join for the same IP multicast group from multiple ports. Similarly, the Ethernet header that carries an IGMP or MLD prune packet may be encoded by the originating host with MRG-DEL-NEG-PROP in the DMAC field and with the SMAC field including the multicast MAC address mapped from the IP multicast group address in IGMP or MLD packet. When an Ethernet bridge receives the IGMP or MLD prune packet, it finds the MRG-DEL-NEG-PROP address in the DMAC field so the Ethernet bridge deletes the association of the SMAC from the receiving port (of the packet) in the MAC forwarding table of the lowermost context associated with the packet and, if no more forwarding ports associated with the SMAC entry exist in the MAC forwarding table, then the SMAC entry is deleted. As such, using MAC address registration, IGMP or MLD snooping is completely avoided by the bridges and the multicast tree is constructed using the data plane header alone.

It will be appreciated that various example embodiments for supporting in-band MAC address registration may be further understood by considering the various methods discussed below.

Various example embodiments are configured to support in-band MAC address registration, irrespective of the type of registration.

Figure 19:
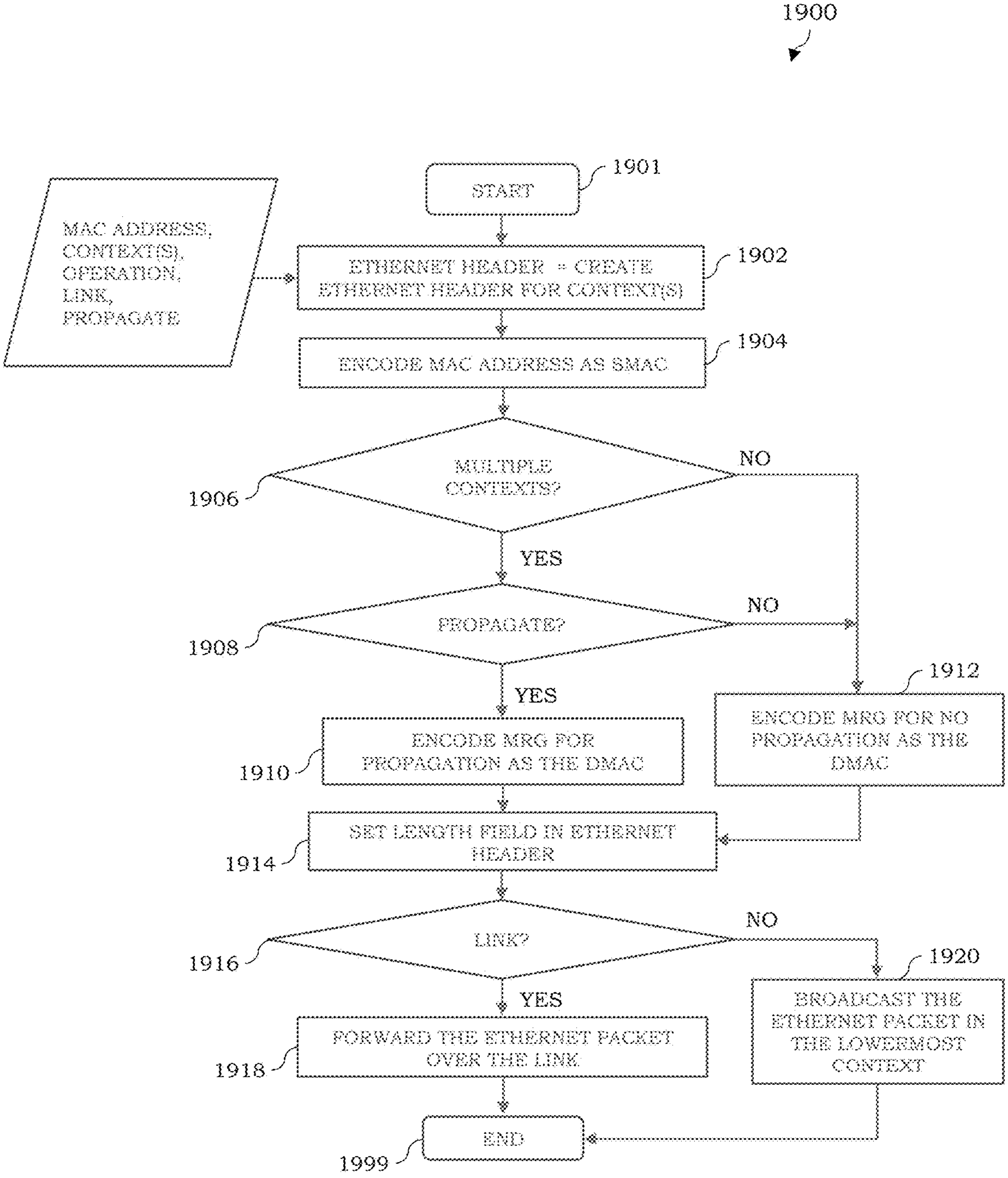
FIG. 19 depicts an example embodiment of a method for use by an originator of a MAC address registration message to originate a MAC address registration message.

FIG. 19 depicts an example embodiment of a method for use by an originator of a MAC address registration message to originate a MAC address registration message. It will be appreciated that, although primarily presented herein as being performed serially, at least a portion of the functions of method 1900 may be performed contemporaneously or in a different order than as presented in FIG. 19. The inputs to the method 1900 include: (1) MAC address to be registered (if 0 then it means wildcard registration, (2) context(s) associated with the registration (e.g., 802.1q tag, 802.1ad tags, 802.1ah tags, or the like), (3) MAC address registration operation type (e.g., populate, positive purge, negative purge, or the like), (4) link identifier, if there is a need to forward the MAC address registration message on a specific link (certain operation types may require forwarding the packet on a specific link; if link is not specified it means broadcast on all links associated with the lowermost context, and (5) an indication as to whether propagation to the uppermost context is required (this parameter is applicable when multiple contexts are associated with the packet). At block 1901, the method 1900 begins. Block 1902 creates an empty Ethernet header with the encapsulations for the input context(s), and then the method 1900 proceeds to block 1904. Block 1904 encodes the input MAC address as SMAC in Ethernet header, and then the method 1900 proceeds to block 1906. Block 1906 checks if there is more than one context in the Ethernet header. If there is more than one context in the Ethernet header then the method 1900 proceeds to block 1908, otherwise the method 1900 proceeds to block 1912. Block 1908 checks if the input specified a requirement for propagation to the uppermost context. For example, this would be the case for the bridge in an 802.1ad network that pushes both S-VLAN and C-VLAN into the packet, and needs to determine if the packet needs to be propagated to the customer network (in the context of the C-VLAN). Similarly, this would be the case when a BEB in an 802.1ah network originates the packet in the context of an I-SID and needs to determine if the packet needs to be propagated to the customer network (e.g., in the context of an S-VLAN). If propagation to the uppermost context is needed then the method 1900 proceeds to block 1910, otherwise the method 1900 proceeds to block 1912. Block 1910 encodes the MRG as DMAC in Ethernet header, which indicates the need for propagation to uppermost context for the operation type. This block proceeds to block 1914. Block 1912 encodes the MRG as DMAC in Ethernet header, which indicates no requirement for propagation to the uppermost context for the operation type, and the method 1900 then proceeds to block 1914. Block 1914 sets the Ethertype field after the context specific headers (if any) encapsulated by the Ethernet header as 0, since no payload or upper layer protocol is associated with the packet. If the MAC address registration message includes a payload then the Ethertype field is encoded with the value assigned for the upper layer protocol, which is the case with IGMP or MLD packets wherein the upper layer protocol of the Ethernet Header is IP which further encapsulates an IGMP or MLD packet. If the Ethertype field has values less than 1500, then the field is considered as the length field. From block 1914, the method 1900 proceeds to block 1916. Block 1916 checks if a forwarding link is specified. If a forwarding link is specified then the method 1900 proceeds to block 1918, otherwise the method 1900 proceeds to block 1920. Block 1918 forwards the Ethernet packet on the specified link and then the method 1900 proceeds to block 1999 where the method 1900 ends. Block 1920 broadcasts the Ethernet packet to all links associated with the lowermost context of the packet. For example, if the contexts are composed of 802.1ad headers, then the lowermost context is the S-VLAN and the uppermost context is the C-VLAN. In that case, the packet is forwarded to all links configured with the S-VLAN. At block 1999, the method 1900 ends.

Figure 20:
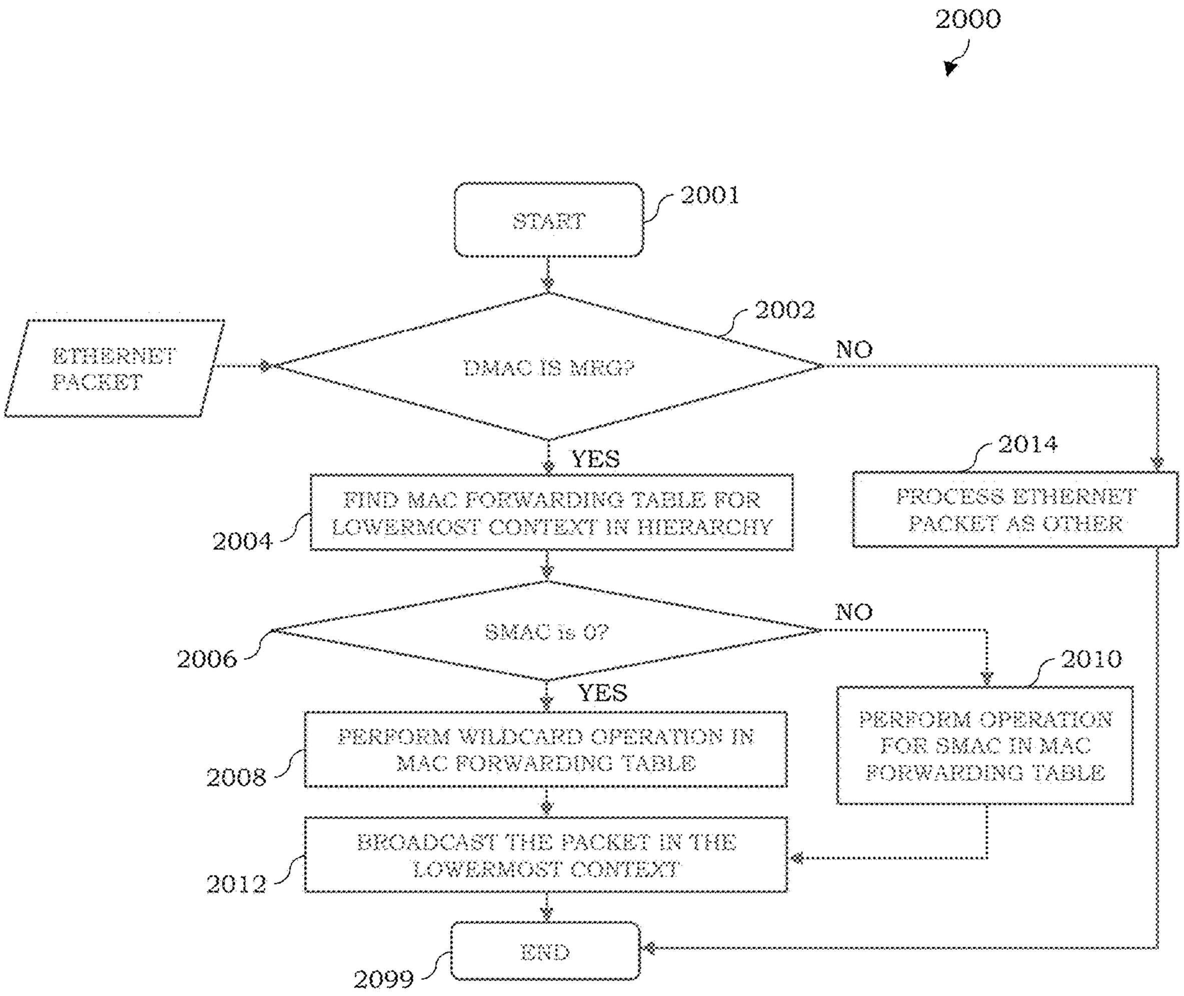
FIG. 20 depicts an example embodiment of a method for use by a receiver of a MAC address registration message to process a MAC address registration message.

FIG. 20 depicts an example embodiment of a method for use by a receiver of a MAC address registration message to process a MAC address registration message. It will be appreciated that the method 2000 may be an extension to the general processing and forwarding of Ethernet packets. It will be appreciated that, although primarily presented herein as being performed serially, at least a portion of the functions of method 2000 may be performed contemporaneously or in a different order than as presented in FIG. 20. The input to the method is a received Ethernet packet. At block 2001, the method 2000 begin. Block 2002 checks if the DMAC is one of the MRGs. If the DMAC is not one of the MRGs then the method 2000 proceeds to block 2014, otherwise the method 2000 proceeds to block 2004. Block 2014 processes the Ethernet packet as "other" packet (i.e., non MAC address registration messages), and then the method 2000 proceeds to block 2099 where the method 2000 terminates. Block 2004 determines the MAC forwarding table for the lowermost context in the hierarchy of contexts associated with the packet. For example, if there is no context specific encapsulation in the received packet, then the default MAC forwarding table is identified. If this is an 802.1ad packet then the MAC forwarding table for the S-VLAN is identified. If this is 802.1q packet then the MAC forwarding table for the C-VLAN is identified. If the context of the packet is an I-SID then the MAC forwarding table for the I-SID is identified. From block 2004, the method 2000 proceeds to block 2006. Block 2006 checks if the value of SMAC is 0, i.e., if this is a wildcard MAC address registration operation. If the value of SMAC is 0 then the method 2000 proceeds to block 2008, otherwise the method 2000 proceeds to block 2010. Block 2008 performs a wildcard operation in the MAC forwarding table based on the operation type, and then the method 2000 proceeds to block 2012. Block 2010 performs the operation of the MAC address specified by SMAC in the MAC forwarding table based on the operation type, and the method 2000 then proceeds to block 2012. Block 2012 broadcasts the packet in the context of the lowermost context. At block 2099, the method 2000 ends.

Figure 21:
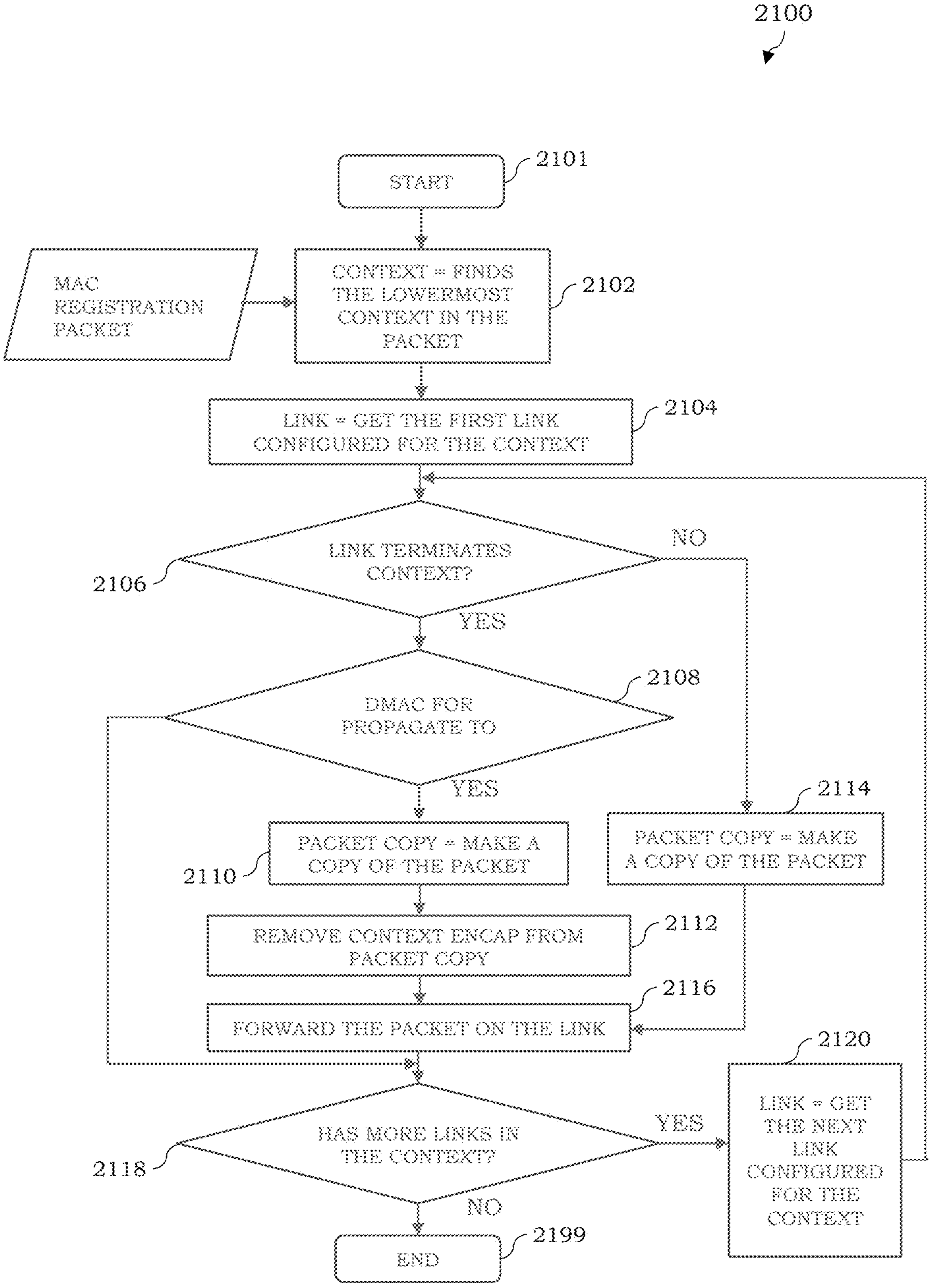
FIG. 21 depicts an example embodiment of a method for use by a bridge to broadcast a MAC address registration message to all neighbors in the context of the lowermost hierarchy associated with the packet.

FIG. 21 depicts an example embodiment of a method for use by a bridge to broadcast a MAC address registration message to all neighbors in the context of the lowermost hierarchy associated with the packet. It will be appreciated that the method 2100 may be used to implement block 1920 in the method 1900 of FIG. 19 and may be used to implement block 2012 in the method 2000 of FIG. 20. It will be appreciated that, although primarily presented herein as being performed serially, at least a portion of the functions of method 2100 may be performed contemporaneously or in a different order than as presented in FIG. 21. The input to the method is a MAC address registration message. At block 2101, the method 2100 begins. Block 2102 finds the lowermost context associated with the packet and the method 2100 then proceeds to block 2104. For example, if the context stack is the 802.1ad encapsulation then the lowermost context is the S-VLAN associated with the packet. Block 2104 retrieves the first link configured with the lowermost context, and the method 2100 then proceeds to block 2106. Block 2106 checks if the link is the termination of the lowermost context. If the link is the termination of the lowermost context then the method 2100 proceeds to block 2108, otherwise the method 2100 proceeds to block 2114. Block 2114 makes a copy of the packet and the method 2100 then proceeds to block 2116. Block 2108 checks if the DMAC in the packet indicates propagation of the packet to the uppermost context. If the DMAC in the packet indicates propagation of the packet to the uppermost context then the method 2100 proceeds to block 2110, otherwise the method 2100 proceeds to block 2118, which skips forwarding the packet on the link. Block 2110 makes a copy of the packet, and the method 2100 then proceeds to block 2112. Block 2112 removes the encapsulation of the lowermost context, and the method 2100 then proceeds to block 2116. Block 2116 forwards the packet on the link, and the method 2100 then proceeds to block 2118. Block 2118 checks if there are more links configured with the lowermost context. If there are more links configured with the lowermost context then the method 2100 proceeds to block 2120, otherwise the method 2100 proceeds to block 2199 where the method 2100 ends. Block 2120 retrieves the next link configured with the lowermost context, and the method 2100 then returns to block 2106 to repeat subsequent blocks for this link.

Figure 22:
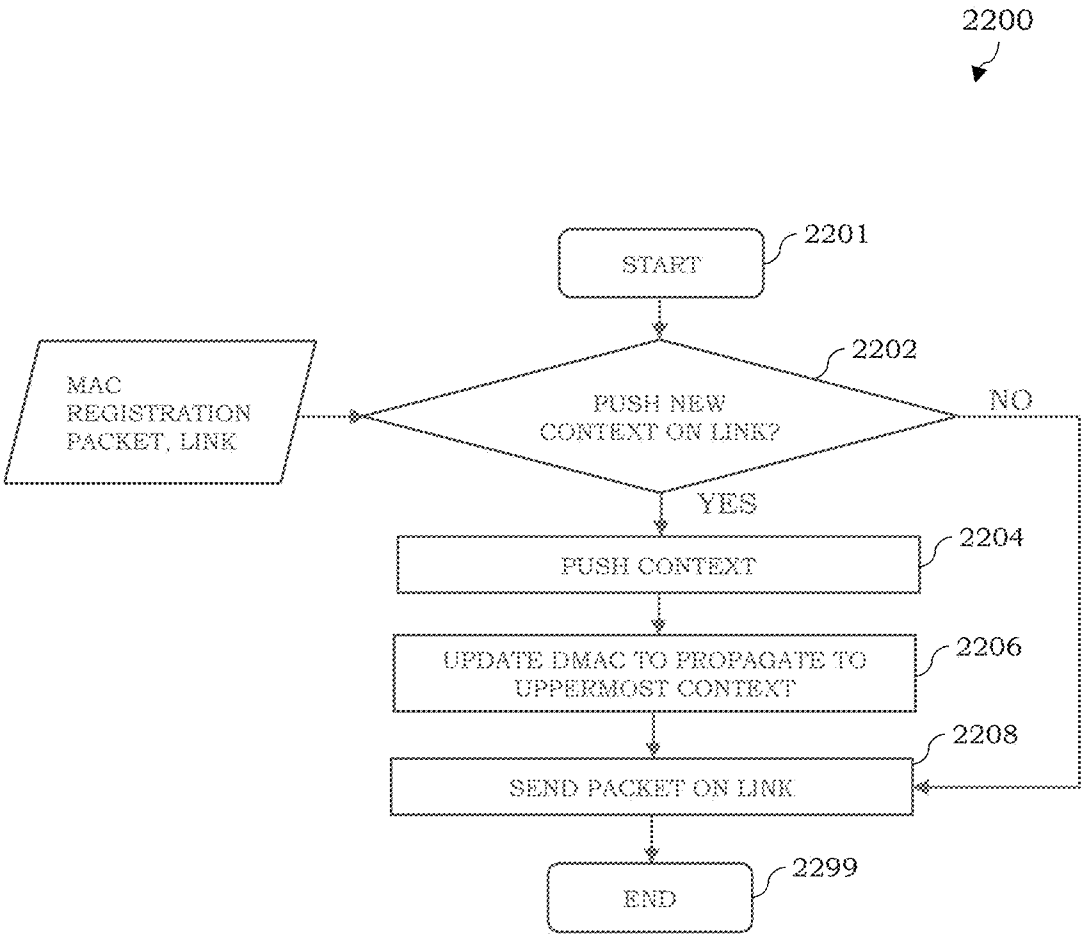
FIG. 22 depicts an example embodiment of a method for use by a bridge to forward a MAC address registration message on a specific link.

FIG. 22 depicts an example embodiment of a method for use by a bridge to forward a MAC address registration message on a specific link. It will be appreciated that the method 2200 may be used to implement block 2116 in the method 2100 of FIG. 21. It will be appreciated that, although primarily presented herein as being performed serially, at least a portion of the functions of method 2200 may be performed contemporaneously or in a different order than as presented in FIG. 22. The inputs to the method include (1) the MAC address registration message and (2) an indication of the link on which to forward the packet. At block 2201, the method 2200 begins. Block 2202 checks if the link requires a new context to be pushed to the packet. For example, the bridge could be a provider edge bridge in an 802.1ad network and the packet was originated from a customer network. In that case, the packet arrived on this bridge with C-VLAN and, before forwarding on the link, the bridge needs to push the S-VLAN into the packet. Similarly, the bridge could be a BEB in an 802.1ah network and the packet was originated from a customer network. In that case, the packet arrived on this bridge with S-VLAN and, before forwarding on the link, the bridge needs to push I-SID into the packet. If the link requires a new context to be pushed then the method 2200 proceeds to block 2204, otherwise the method 2200 proceeds to block 2208. Block 2204 pushes the encapsulation of the new context onto the packet, and the method 2200 then proceeds to block 2206. Block 2206 updates the DMAC in the Ethernet header to indicate the requirement for propagation to the uppermost context, and the method 2200 then proceeds to block 2208. Block 2208 sends out the packet on the link. At block 2299, the method 2200 ends.

Various example embodiments are configured to support in-band MAC address registration where the in-band MAC address registration supports a MAC populate operation (e.g., where the methods of FIGS. 19-22 may be used for a MAC populate operation).

Figure 23:
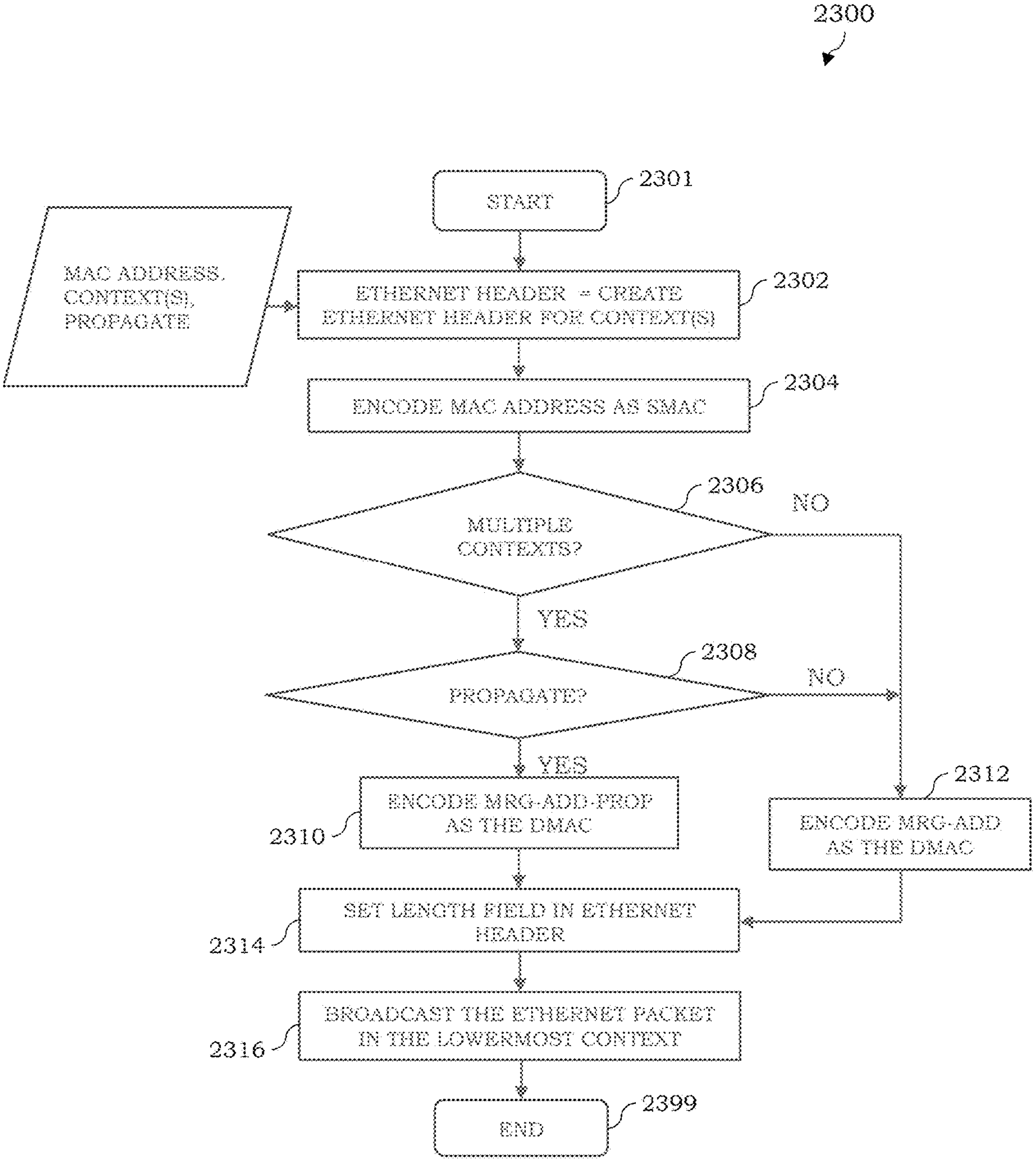
FIG. 23 depicts an example embodiment of a method for use by an originator of a MAC populate packet to originate a MAC populate packet.

FIG. 23 depicts an example embodiment of a method for use by an originator of a MAC populate packet to originate a MAC populate packet. It will be appreciated that, although primarily presented herein as being performed serially, at least a portion of the functions of method 2300 may be performed contemporaneously or in a different order than as presented in FIG. 23. The inputs to the method include (1) the MAC address to be populated, (2) context(s) associated with the registration (e.g., 802.1q tag, 802.1ad tags, 802.1ah tags, or the like), and (3) an indication as to whether propagation to the uppermost context is required (this parameter is applicable when multiple contexts are associated with the packet). The method starts at block 2302. Block 2302 creates an empty Ethernet header with the encapsulations for the input context(s), and the method 2300 then proceeds to block 2304. Block 2304 encodes the input MAC address as the SMAC in the Ethernet header, and the method 2300 then proceeds to block 2306. Block 2306 checks if there is more than one context in the Ethernet header. If there is more than one context in the Ethernet header then the method 2300 proceeds to block 2308, otherwise the method 2300 proceeds to block 2312. Block 2308 checks if the input specified a requirement for propagation to the uppermost context. For example, this would be the case for the bridge in an 802.1ad network that pushes both S-VLAN and C-VLAN into the packet, and needs to determine if the MAC address needs to be populated across the customer network (in the context of the C-VLAN). Similarly, this would be the case when a BEB in an 802.1ah network originates the packet in the context of an I-SID and needs to determine if the MAC address needs to be populated across the customer network (e.g., in the context of a S-VLAN). If propagation to the uppermost context is needed then the method 2300 proceeds to block 2310, otherwise the method 2300 proceeds to block 2312. Block 2310 encodes the MRG-ADD-PROP as the DMAC in the Ethernet header, and the method 2300 then proceeds to block 2314. Block 2312 encodes the MRG-ADD as the DMAC in the Ethernet header, and the method 2300 then proceeds to block 2314. Block 2314 sets the Ethertype field after the context specific headers (if any) encapsulated by the Ethernet header to 0 to indicate the absence of a payload or upper layer protocol. If the Ethertype field has values less than 1500, then the Ethertype field is considered as the Length field. If the MAC address registration message includes a payload then the Ethertype field is encoded with the value assigned for the upper layer protocol, which is the case with IGMP or MLD packets wherein the upper layer protocol of the Ethernet Header is IP which further encapsulates an IGMP or MLD packet. From the block 2314 the method 2300 proceeds to block 2316. Block 2316 broadcasts the Ethernet packet to all links associated with the lowermost context of the packet. For example, if the contexts are composed of 802.1ad headers then the lowermost context is the S-VLAN and the uppermost context is the C-VLAN. In that case, the packet is forwarded to all links configured with the S-VLAN. At block 2399, the method 2300 ends.

Figure 24:
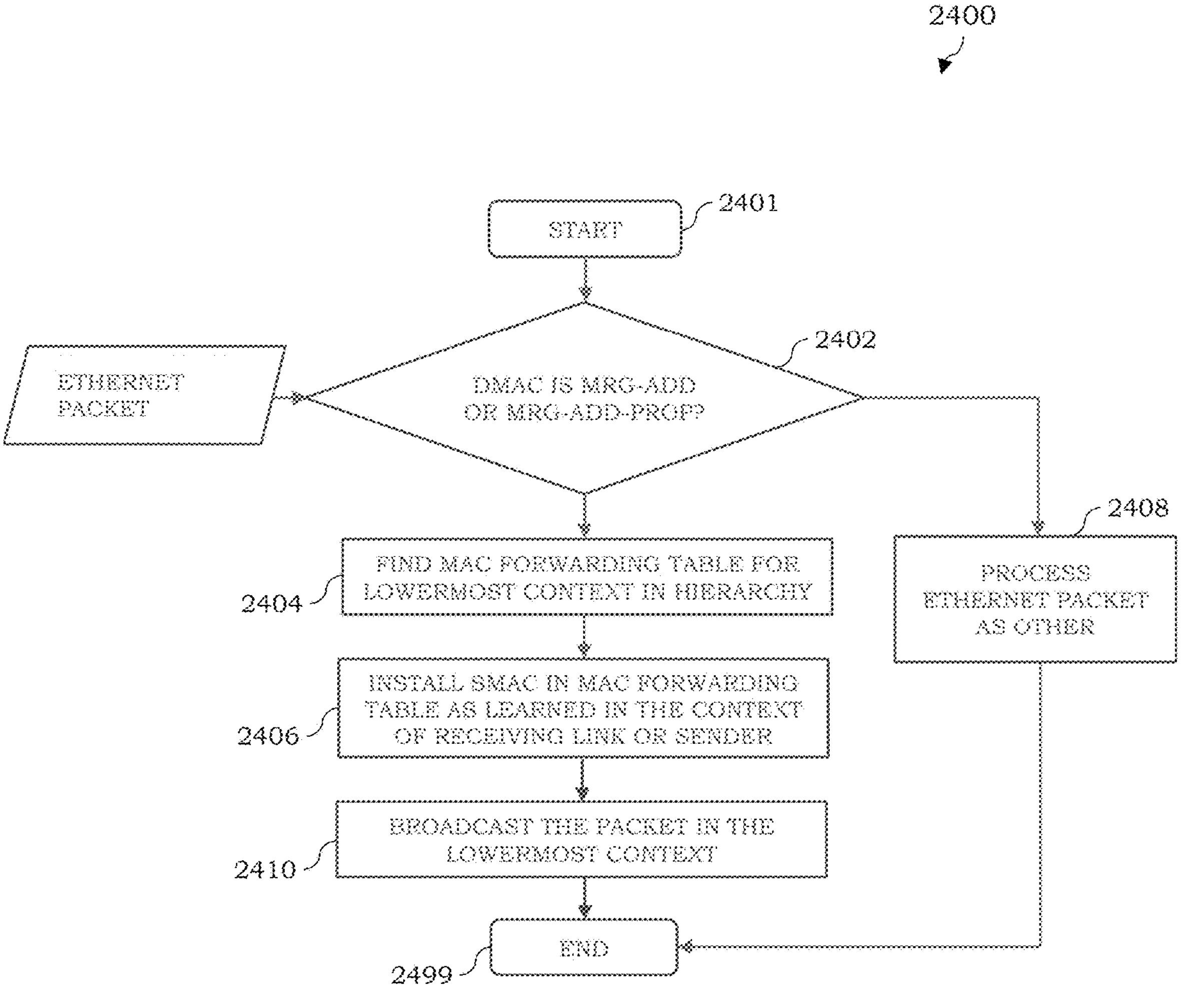
FIG. 24 depicts an example embodiment of a method for use by a receiver of a MAC populate packet to process the MAC populate packet.

FIG. 24 depicts an example embodiment of a method for use by a receiver of a MAC populate packet to process the MAC populate packet. It will be appreciated that the method 2400 may be an extension to the general processing and forwarding of Ethernet packets. It will be appreciated that, although primarily presented herein as being performed serially, at least a portion of the functions of method 2400 may be performed contemporaneously or in a different order than as presented in FIG. 24. The input to the method is a received Ethernet packet. At block 2401, the method 2400 begins. Block 2402 checks if the DMAC is either MRG-ADD or MRG-ADD-PROP. If the DMAC is not one of the expected MRGs then the method 2400 proceeds to block 2408, otherwise the method 2400 proceeds to block 2402. Block 2408 processes the Ethernet packet as "other" packet, and then the method 2400 proceeds to block 2499 where the method 2400 ends. Block 2404 determines the MAC forwarding table for the lowermost context in the hierarchy of contexts. For example, if there is no context specific encapsulation in the received packet, then the default MAC forwarding table is identified. If this is an 802.1ad packet then the MAC forwarding table for the S-VLAN is identified. If this is an 802.1q packet then the MAC forwarding table for the C-VLAN is identified. If the context of the packet is an I-SID then the MAC forwarding table for the I-SID is identified. From block 2404, the method 2400 proceeds to block 2406. Block 2406 installs the SMAC in the MAC forwarding table as if learned from the receiving link or learned from the sender. For example, when a BEB in 802.1ah network receives the packet in the context of an I-SID then it installs the MAC address into the I-SID forwarding table as learned from the sender BEB (i.e., its BMAC). From block 2406, the method 2400 proceeds to block 2410. Block 2410 broadcasts the packet in the context of the lowermost context. This block may be implemented by the method 2100 in FIG. 21. At block 2499, the method 2400 ends.

Various example embodiments are configured to support in-band MAC address registration where the in-band MAC address registration supports an in-band positive MAC purge operation (e.g., where the methods of FIGS. 19-22 may be used for the positive MAC purge operation).

Figure 25:
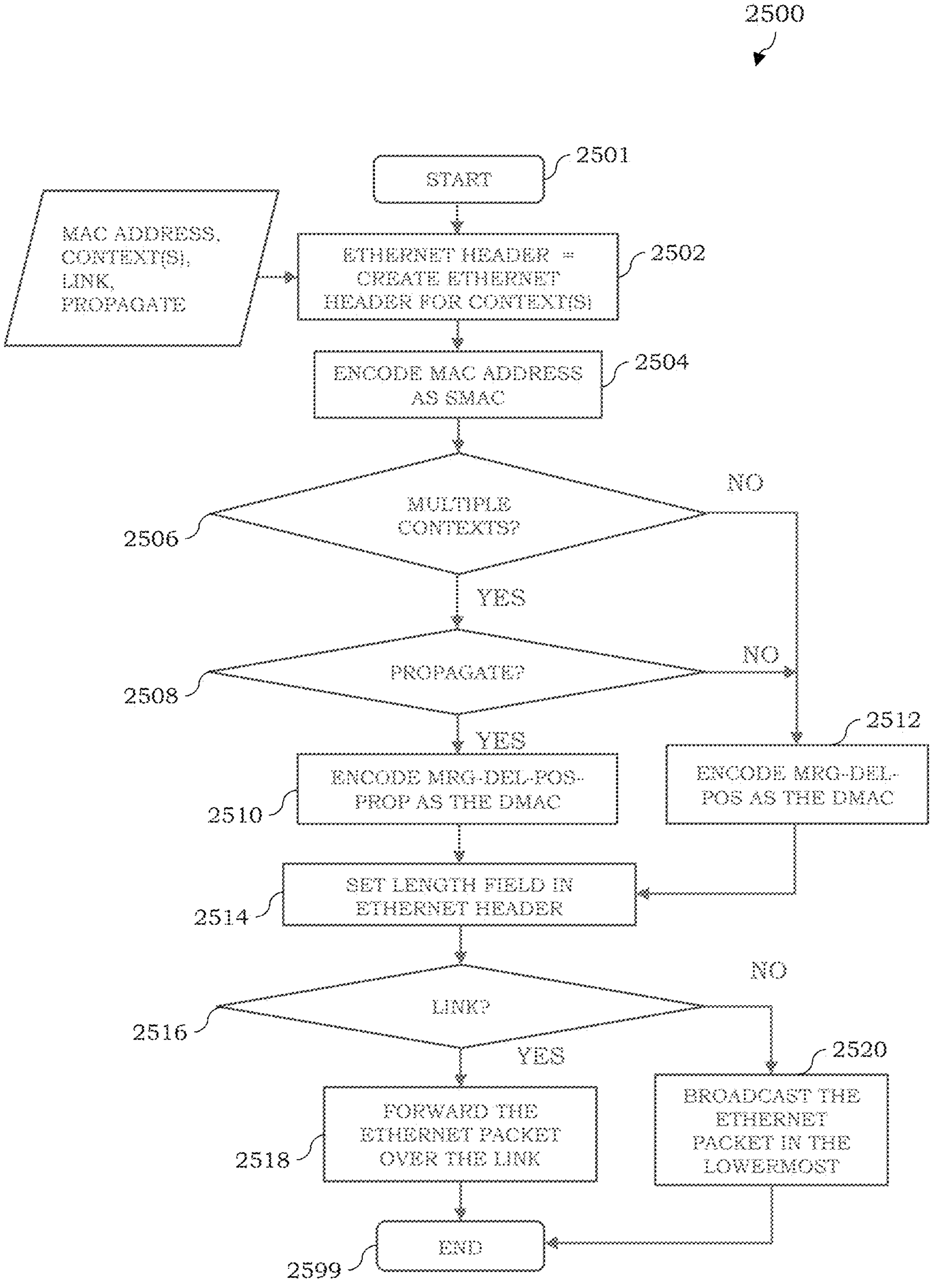
FIG. 25 depicts an example embodiment of a method for use by an originator of a positive MAC purge packet to originate the positive MAC purge packet.

FIG. 25 depicts an example embodiment of a method for use by an originator of a positive MAC purge packet to originate the positive MAC purge packet. It will be appreciated that, although primarily presented herein as being performed serially, at least a portion of the functions of method 2500 may be performed contemporaneously or in a different order than as presented in FIG. 25. The inputs to the method include (1) the MAC address to be purged (if 0 then it means wildcard purging, (2) context(s) associated with the registration (e.g., 802.1q tag, 802.1ad tags, 802.1ah tags, or the like), (3) link identifier, if there is a need to forward the positive MAC purge packet on a specific link (if link is not specified it means broadcast the packet on all links associated with the lowermost context), and (4) an indication as to whether propagation to the uppermost context is required (this parameter is applicable when multiple contexts are associated with the packet). At block 2501, the method 2500 begins. Block 2502 creates an empty Ethernet header with the encapsulations for the input context(s), and then the method 2500 proceeds to block 2504. Block 2504 encodes the input MAC address as the SMAC in the Ethernet header, and the method 2500 then proceeds to block 2506. Block 2506 checks if there is more than one context in the Ethernet header. If there is more than one context in the Ethernet header, then the method 2500 proceeds to block 2508, otherwise the method 2500 proceeds to block 2512. Block 2508 checks if the input specified a requirement for propagation to the uppermost context. For example, this would be the case for the bridge in an 802.1ad network that pushes both S-VLAN and C-VLAN into the packet, and needs to determine if the packet needs to be propagated to the customer network (in the context of the C-VLAN). Similarly, this would be the case when a BEB in an 802.1ah network originates the packet in the context of an I-SID and needs to determine if the packet needs to be propagated to the customer network (e.g., in the context of a S-VLAN). If propagation to the uppermost context is needed then the method 2500 proceeds to block 2510, otherwise the method 2500 proceeds to block 2512. Block 2510 encodes the MRG-DEL-POS-PROP as the DMAC in the Ethernet header, and the method 2500 then proceeds to block 2514. Block 2512 encodes the MRG-DEL-POS as the DMAC in the Ethernet header, and the method 2500 then proceeds to block 2514. Block 2514 sets the Ethertype field after the context specific headers (if any) encapsulated by the Ethernet header as 0 to indicate there is no payload or upper layer protocol in the packet. It is noted that the Length field is the same as the Ethertype field. If the Ethertype field has values less than 1500, then the Ethertype field is considered as the Length field. If the MAC address registration message includes a payload then the Ethertype field is encoded with the value assigned for the upper layer protocol, which is the case with IGMP or MLD packets wherein the upper layer protocol of the Ethernet Header is IP which further encapsulates an IGMP or MLD packet. From block 2514, the method 2500 proceeds to block 2516. Block 2516 checks if a forwarding link is specified. If a forwarding link is specified then the method 2500 proceeds to block 2518, otherwise the method 2500 proceeds to block 2520. Block 2518 forwards the Ethernet packet on the specified link and then the method 2500 proceeds to block 2599 where the method 2500 ends. Block 2520 broadcasts the Ethernet packet to all links associated with the lowermost context of the packet. This block may be implemented by the method 2100 in FIG. 21. At block 2599, the method 2500 terminates.

Figure 26:
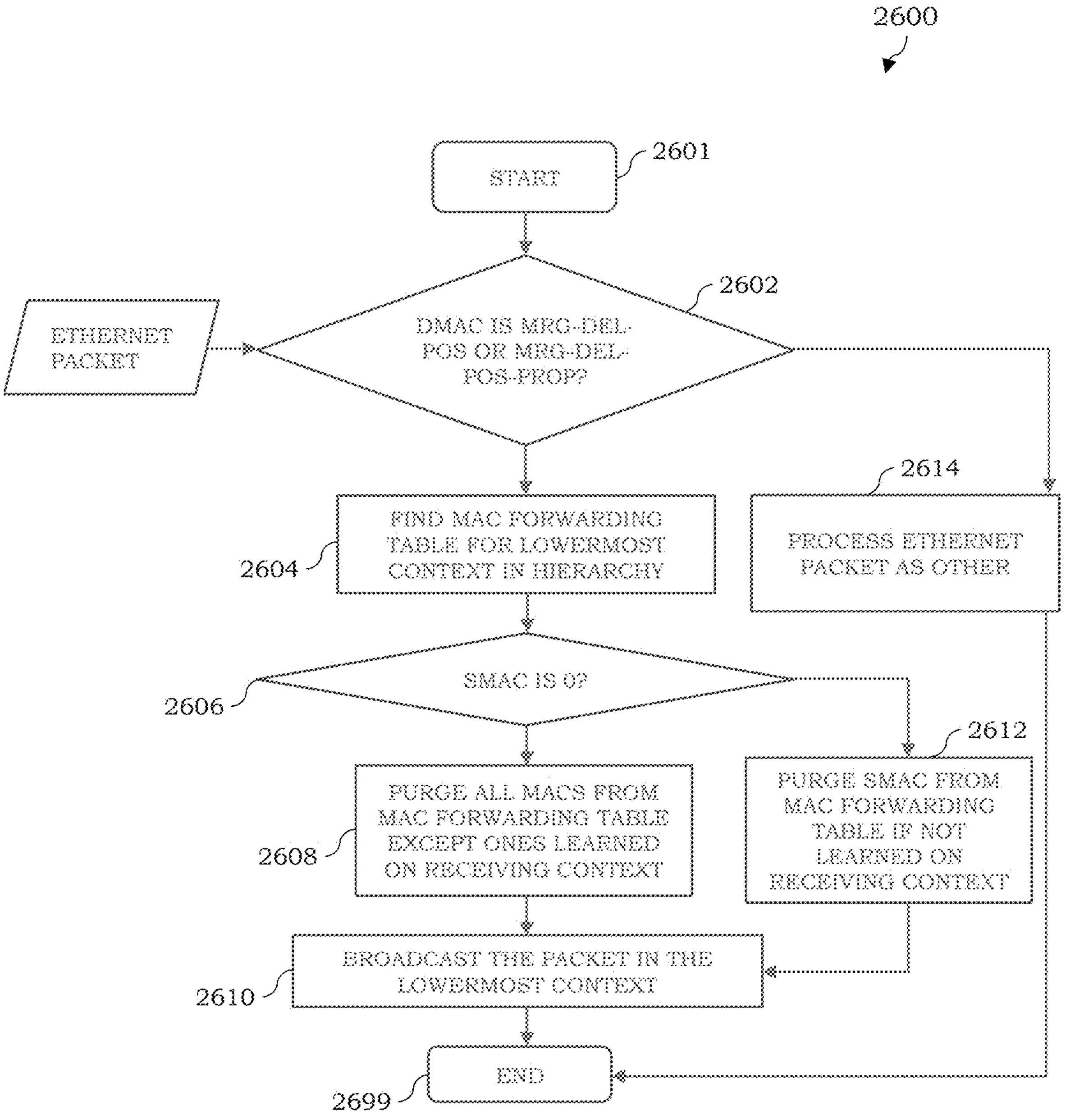
FIG. 26 depicts an example embodiment of a method for use by a receiver of a positive MAC purge packet to process the positive MAC purge packet.

FIG. 26 depicts an example embodiment of a method for use by a receiver of a positive MAC purge packet to process the positive MAC purge packet. It will be appreciated that the method 2600 may be an extension to the general processing and forwarding of Ethernet packets. It will be appreciated that, although primarily presented herein as being performed serially, at least a portion of the functions of method 2600 may be performed contemporaneously or in a different order than as presented in FIG. 26. The input to the method is a received Ethernet packet. At block 2601, the method 2600 begins. Block 2602 checks if the DMAC is either MRG-DEL-POS or MRG-DEL-POS-PROP. If the DMAC is not one of the expected MRGs then the method 2600 proceeds to block 2614, otherwise the method 2600 proceeds to block 2604. Block 2614 processes the Ethernet packet as "other" packet, and then the method 2600 proceeds to block 2699 where the method 2600 ends. Block 2604 determines the MAC forwarding table for the lowermost context in the hierarchy of contexts. For example, if there is no context specific encapsulation in the received packet, then the default MAC forwarding table is identified. If this is an 802.1ad packet then the MAC forwarding table for the S-VLAN is identified. If this is an 802.1q packet then the MAC forwarding table for the C-VLAN is identified. If the context of the packet is an I-SID then the MAC forwarding table for the I-SID is identified. From block 2604, the method 2600 proceeds to block 2606. Block 2606 checks if the value of SMAC is 0, i.e., if this is a wildcard positive MAC purge operation. If value of SMAC is 0, then the method 2600 proceeds to block 2608, otherwise the method 2600 proceeds to block 2610. Block 2608 purges all MAC addresses from the MAC forwarding table except the ones learned from the receiving context. For example, if the positive MAC purge is received by a BEB (in an 802.1ah network) in the context of an I-SID from the backbone then the receiving context is the remote BEB that sent the packet. In that case, all MAC addresses except the ones learned from the remote BEB are purged from the MAC forwarding table for the I-SID. For other kind of networks, the receiving context is the link on which the positive MAC purge was received. In that case, all MAC addresses except the ones learned from the receiving link are purged from the MAC forwarding table of the lowermost context. From block 2608, the method 2600 proceeds to block 2612. Block 2610 purges the SMAC in the MAC forwarding table if the MAC address was not learned from the receiving context, and the method 2600 then proceeds to block 2612. Block 2612 broadcasts the packet in the context of the lowermost context. This block may be implemented by the method 2100 in FIG. 21. At block 2699, the method 2600 ends.

Various example embodiments are configured to support in-band MAC address registration where the in-band MAC address registration supports an in-band negative MAC purge operation (e.g., where the methods of FIGS. 19-22 may be used for the negative MAC purge operation).

Figure 27:
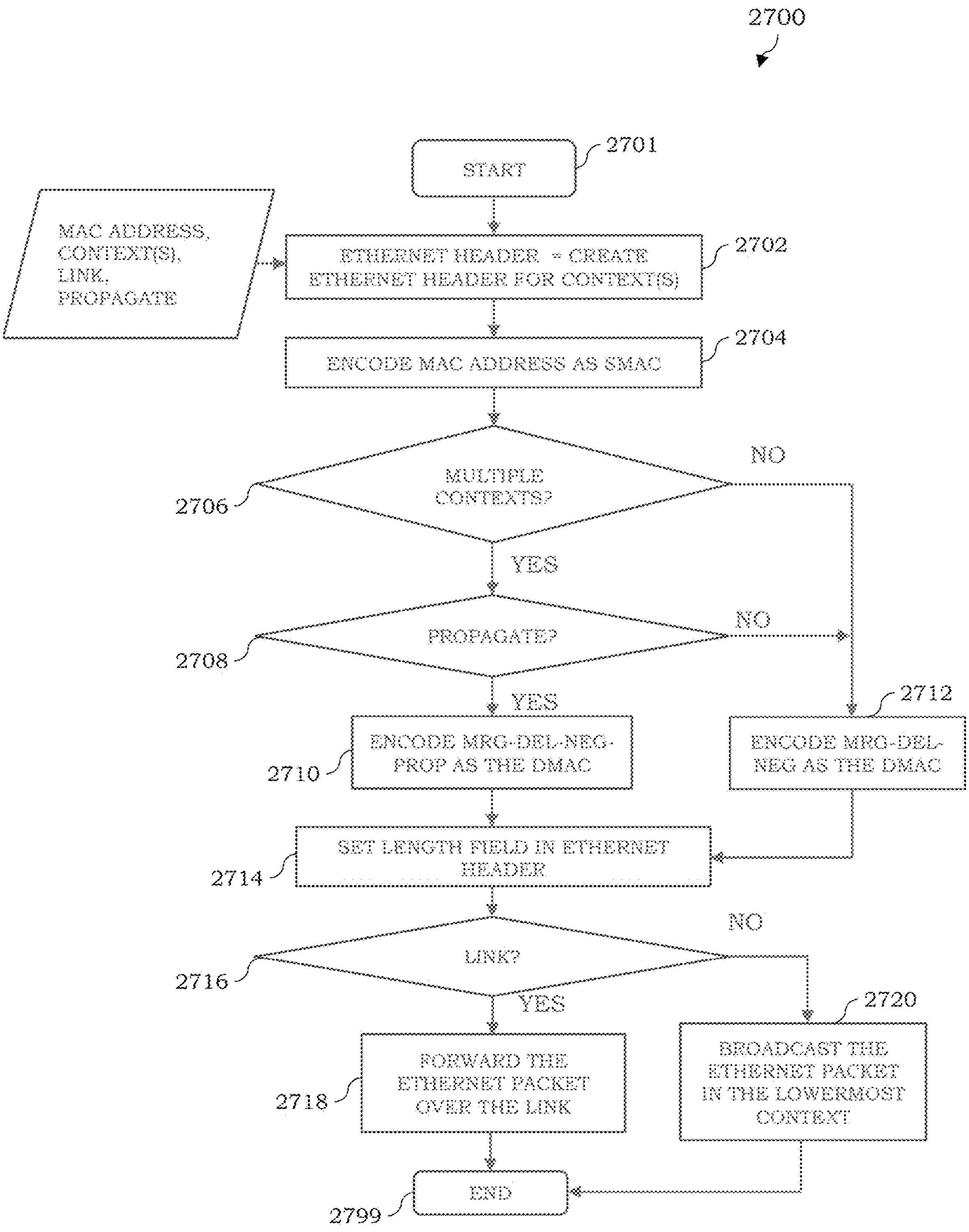
FIG. 27 depicts an example embodiment of a method for use by an originator of a negative MAC purge packet to originate the negative MAC purge packet.

FIG. 27 depicts an example embodiment of a method for use by an originator of a negative MAC purge packet to originate the negative MAC purge packet. It will be appreciated that, although primarily presented herein as being performed serially, at least a portion of the functions of method 2700 may be performed contemporaneously or in a different order than as presented in FIG. 27. The inputs to the method include (1) the MAC address to be purged (if 0 then it means wildcard purging), (2) context(s) associated with the registration (e.g., 802.1q tag, 802.1ad tags, 802.1ah tags, or the like), (3) a link identifier, if there is a need to forward the negative MAC purge packet on a specific link (if link is not specified it means broadcast the packet on all links associated with the lowermost context), and (4) an indication as to whether propagation to the uppermost context is required (this parameter is applicable when multiple contexts are associated with the packet). At block 2701, the method 2700 begins. Block 2702 creates an empty Ethernet header with the encapsulations for the input context(s), and the method 2700 then proceeds to block 2704. Block 2704 encodes the input MAC address as the SMAC in the Ethernet header, and the method 2700 then proceeds to block 2706. Block 2706 checks if there is more than one context in the Ethernet header. If there is more than one context then the method 2700 proceeds to block 2708, otherwise the method 2700 proceeds to block 2712. Block 2708 checks if the input specified a requirement for propagation to the uppermost context. For example, this would be the case for the bridge in an 802.1ad network that pushes both S-VLAN and C-VLAN into the packet, and needs to determine if the packet needs to be propagated to the customer network (in the context of the C-VLAN). Similarly, this would be the case when a BEB in an 802.1ah network originates the packet in the context of an I-SID and needs to determine if the packet needs to be propagated to the customer network (e.g., in the context of a S-VLAN). If propagation to the uppermost context is needed then the method 2700 proceeds to block 2710, otherwise the method 2700 proceeds to block 2712. Block 2710 encodes the MRG-DEL-NEG-PROP as the DMAC in the Ethernet header, and then the method 2700 proceeds to block 2714. Block 2712 encodes the MRG-DEL-NEG as the DMAC in the Ethernet header, and then the method 2700 proceeds to block 2714. Block 2714 sets the Ethertype field after the context specific headers (if any) encapsulated by the Ethernet header to 0 to indicate the absence of a payload or upper layer protocol. If the Ethertype field has values less than 1500, then the Ethertype field is considered as the Length field. If the MAC address registration message includes a payload then the Ethertype field is encoded with the value assigned for the upper layer protocol, which is the case with IGMP or MLD packets wherein the upper layer protocol of the Ethernet Header is IP which further encapsulates an IGMP or MLD packet. From block 2714, the method 2700 proceeds to block 2716. Block 2716 checks if a forwarding link is specified. If a forwarding link is specified then the method 2700 proceeds to block 2718, otherwise the method 2700 proceeds to block 2720. Block 2718 forwards the Ethernet packet on the specified link and then the method 2700 proceeds to block 2799 where the method 2700 ends. Block 2720 broadcasts the Ethernet packet to all links associated with the lowermost context of the packet. This block may be implemented by the method 2100 in FIG. 21. At block 2799, the method 2700 ends.

Figure 28:
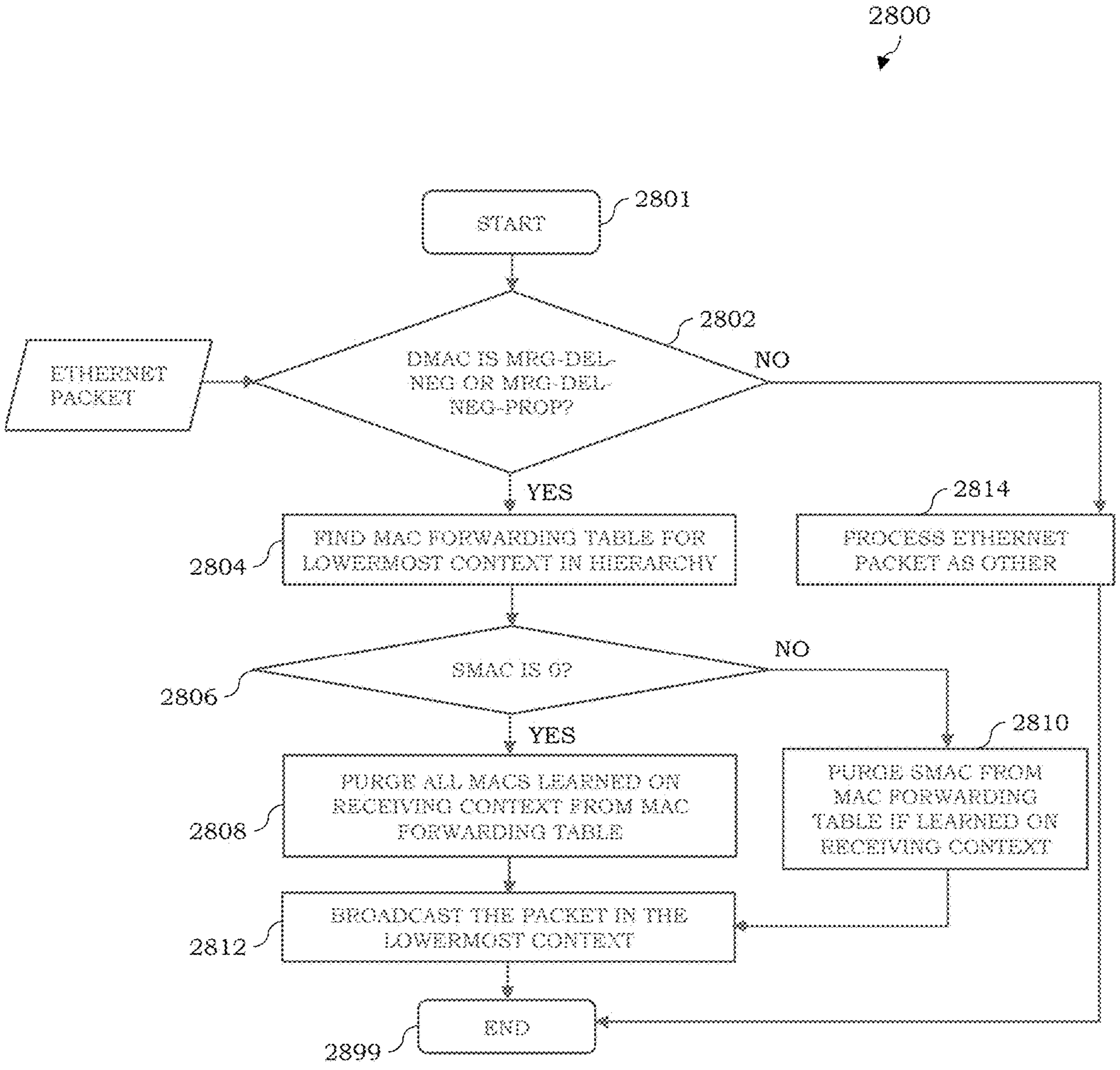
FIG. 28 depicts an example embodiment of a method for use by a receiver of a negative MAC purge packet to process the negative MAC purge packet.

FIG. 28 depicts an example embodiment of a method for use by a receiver of a negative MAC purge packet to process the negative MAC purge packet. It will be appreciated that the method 2800 may be an extension to the general processing and forwarding of Ethernet packets. It will be appreciated that, although primarily presented herein as being performed serially, at least a portion of the functions of method 2800 may be performed contemporaneously or in a different order than as presented in FIG. 28. The input to the method 2800 is a received Ethernet packet. At block 2801, the method 2800 begins. Block 2802 checks if the DMAC is either MRG-DEL-NEG or MRG-DEL-NEG-PROP. If the DMAC is not one of the expected MRGs then the method 2800 proceeds to block 2814, otherwise the method 2800 proceeds to block 2804. Block 2814 processes the Ethernet packet as "other" packet, and then the method 2800 proceeds to block 2899 where the method 2800 ends. Block 2804 determines the MAC forwarding table for the lowermost context in the hierarchy of contexts. For example, if there is no context specific encapsulation in the received packet, then the default MAC forwarding table is identified. If this is an 802.1ad packet then the MAC forwarding table for the S-VLAN is picked up. If this is 802.1q packet then the MAC forwarding table for the C-VLAN is identified. If the context of the packet is an I-SID then the MAC forwarding table for the I-SID is identified. From block 2804, the method 2800 proceeds to block 2806. Block 2806 checks if the value of SMAC is 0, i.e., if this is a wildcard negative MAC purge operation. If the value of SMAC is 0 then the method 2800 proceeds to block 2808, otherwise the method 2800 proceeds to block 2810. Block 2808 purges all MAC addresses learned on the receiving context from the MAC forwarding table. For example, if the negative MAC purge is received by a BEB (in an 802.1ah network) in the context of an I-SID from the backbone then the receiving context is the remote BEB that sent the packet. In that case, all MAC addresses learned from the remote BEB are purged from the MAC forwarding table for the I-SID. For other kind of networks, the receiving context is the link on which the negative MAC purge was received. In that case, all MAC addresses learned from the receiving link are purged from the MAC forwarding table. From block 2808, the method 2800 proceeds to block 2812. Block 2810 purges the SMAC in the MAC forwarding table if it the MAC address was not learned from the receiving context, and the proceeds to block 2812. Block 2812 broadcasts the packet in the context of the lowermost context. This block may be implemented by the method 2100 in FIG. 21. At block 2899, the method 2800 ends.

It will be appreciated that, although primarily presented herein within the context of supporting address registration in an Ethernet-based communication system, address registration also may be supported in various other types of communication systems. Various example embodiments for supporting address registration in a communication system may be configured to support address registration in-band in the data plane of the communication system. Various example embodiments for supporting address registration in-band in the data plane of a communication system may be configured to support address registration in-band in the data plane of the communication system based on use of a data plane header configured to support address registration in-band in the data plane of the communication system. Various example embodiments for supporting address registration in-band in the data plane of a communication system, based on use of a data plane header configured to support address registration in-band in the data plane of the communication system, may be configured to use a destination address field of the data plane header to indicate that the data plane header is being used for an address registration operation (e.g., that the data plane packet that includes the data plane header, which may or may not have a payload associated therewith, is an address registration packet) and to use a source address field of the data plane header to indicate the address(es) for which the address registration operation (e.g., populate or purge) is to be performed. Various example embodiments for supporting address registration in-band in the data plane of a communication system are further described within the context of FIG. 29.

Figure 29:
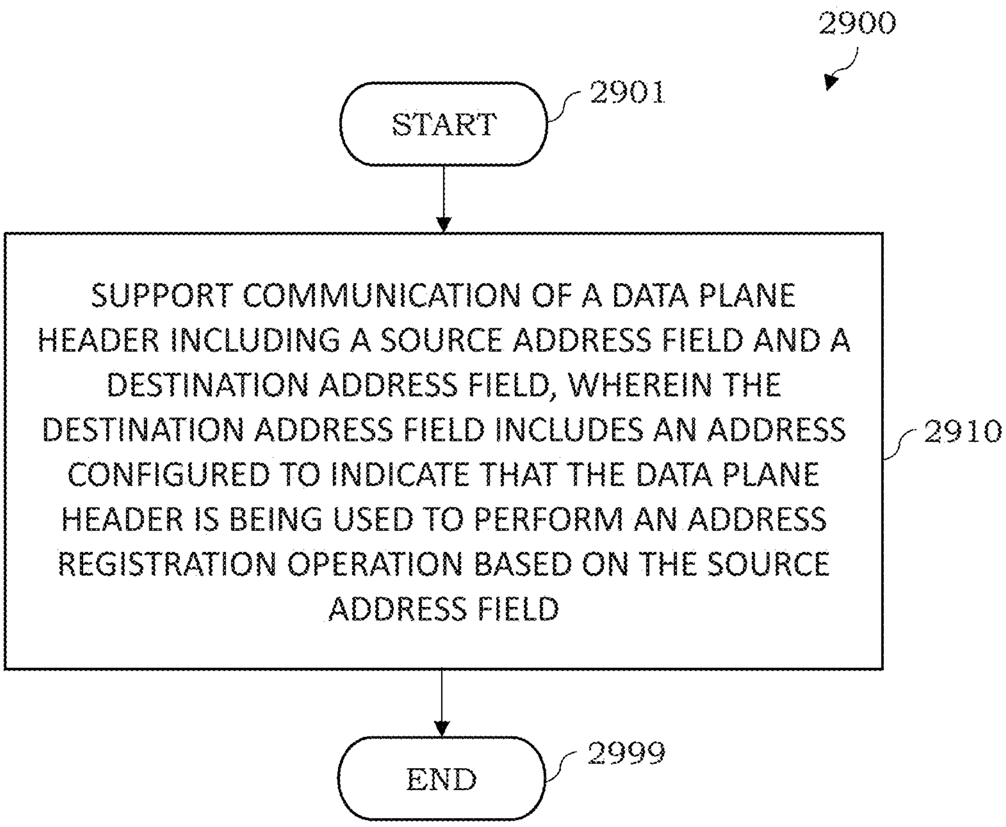
FIG. 29 depicts an example embodiment of a method for supporting address registration in a communication network.

FIG. 29 depicts an example embodiment of a method for supporting address registration in a communication network. It will be appreciated that although primarily presented as being performed serially, at least a portion of the blocks of method 2900 may be performed contemporaneously or in a different order than as presented in FIG. 29. At block 2901, the method 2900 begins. At block 2910, support communication of a data plane header including a source address field and a destination address field, wherein the destination address field includes an address configured to indicate that the data plane header is being used to perform an address registration operation based on the source address field. At block 2999, the method 2900 ends.

Various example embodiments for supporting address registration in communication networks may provide various advantages or potential advantages. For example, various example embodiments for supporting address registration in a communication network may enable address registration to be performed in-band in the data plane using the data plane header (e.g., using the destination address field and source address field in the data plane header), thereby supporting efficient and reliable address registration in the communication network. Various example embodiments for supporting address registration in communication networks may provide various other advantages or potential advantages.

Figure 30:
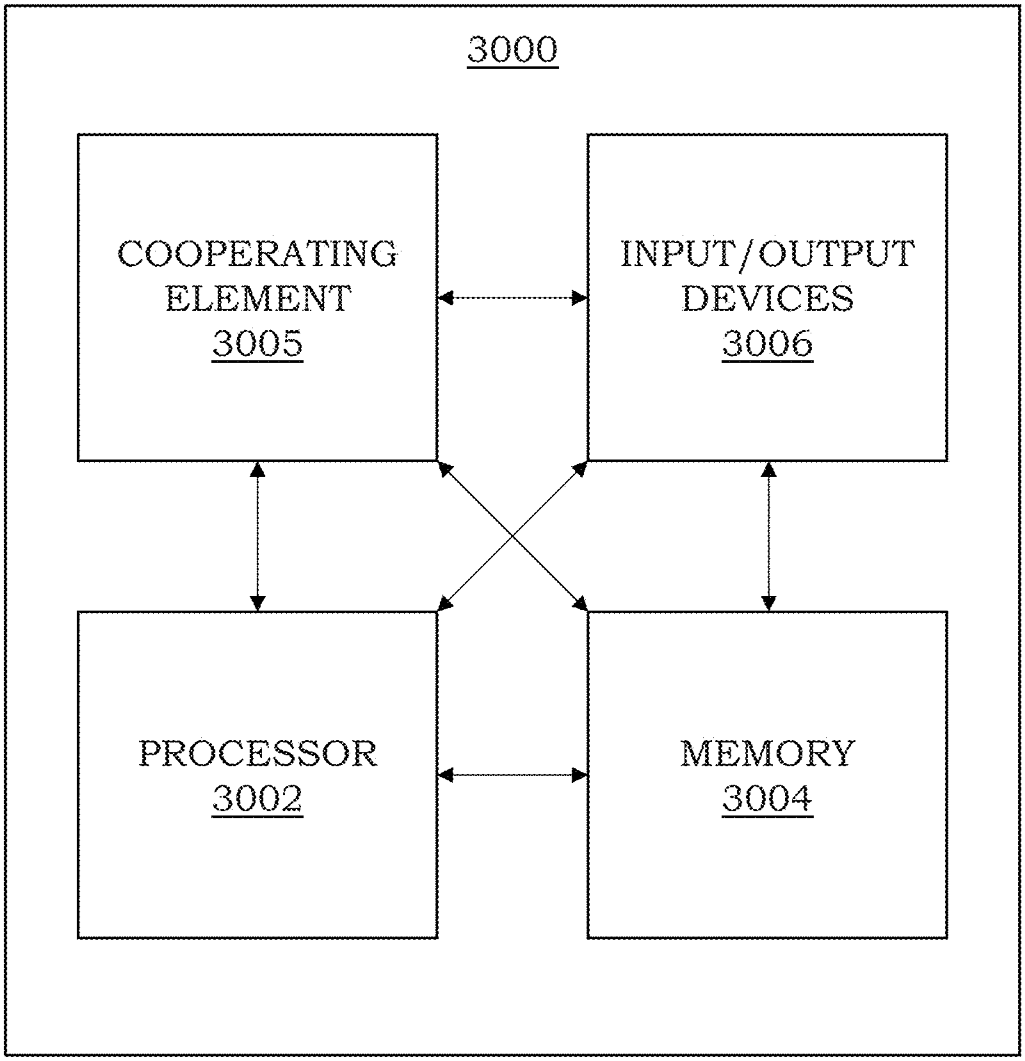
FIG. 30 depicts an example embodiment of a computer suitable for use in performing various functions presented herein.

FIG. 30 depicts an example embodiment of a computer suitable for use in performing various functions presented herein.

The computer 3000 includes a processor 3002 (e.g., a central processing unit (CPU), a processor, a processor having a set of processor cores, a processor core of a processor, or the like) and a memory 3004 (e.g., a random access memory, a read only memory, or the like). The processor 3002 and the memory 3004 may be communicatively connected. In at least some example embodiments, the computer 3000 may include at least one processor and at least one memory including a set of instructions, wherein the set of instructions is configured to, when executed by the at least one processor, cause the computer to perform various functions presented herein.

The computer 3000 also may include a cooperating element 3005. The cooperating element 3005 may be a hardware device. The cooperating element 3005 may be a process that can be loaded into the memory 3004 and executed by the processor 3002 to implement various functions presented herein (in which case, for example, the cooperating element 3005 (including associated data structures) can be stored on a non-transitory computer-readable storage medium, such as a storage device or other suitable type of storage element (e.g., a magnetic drive, an optical drive, or the like)).

The computer 3000 also may include one or more input/output devices 3006. The input/output devices 3006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3000 may represent a general architecture and functionality suitable for implementing functional elements described herein, portions of functional elements described herein, or the like, as well as various combinations thereof. For example, computer 3000 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A network device, comprising:

at least one processor; and at least one memory storing instructions that, when executed by the at least one processor, cause the network device to perform ethernet bridging functions for an ethernet network, wherein the ethernet bridging functions include maintaining a media access control forwarding table and forwarding ethernet frames based on media access control address lookups using the media access control forwarding table, wherein the ethernet bridging functions further include performing media access control address registration, wherein performing media access control address registration includes:

receiving an ethernet data plane header including a source media access control address field and a destination media access control address field, wherein the source media access control address field includes a media access control address, wherein the destination media access control address field includes a value indicative that the ethernet data plane header is being used to perform an address registration operation based on the source media access control address field;

determining, based on the value in the destination media access control address field, an address registration operation type of the address registration operation, wherein the address registration operation type includes one of a positive address purge operation or a negative address purge operation;

identifying, based on a context of the ethernet data plane header, the media access control forwarding table for the address registration operation; and performing, based on the address registration operation type and based on whether the media access control address was learned on the context of the ethernet data plane header, the address registration operation on the media access control forwarding table by purging the media access control address from the media access control forwarding table.

2. The network device of claim 1, wherein the value in the destination media access control address field is indicative as to whether or not the ethernet data plane header is to be propagated to an upper hierarchy.

3. The network device of claim 1, wherein, when the value in the destination media access control address field is indicative that the address registration operation type is the positive address purge operation, the media access control address is purged from the media access control forwarding table based on a determination that the media access control address was not learned on the context of the ethernet data plane header.

4. The network device of claim 1, wherein, when the value in the destination media access control address field is indicative that the address registration operation type is the negative address purge operation, the media access control address is purged from the media access control forwarding table based on a determination that the media access control address was learned on the context of the ethernet data plane header.

5. The network device of claim 1, wherein the instructions, when executed by the at least one processor, cause the network device to perform:

preventing use of the source media access control address field for an address learning operation based on the determination that the ethernet data plane header is being used to perform the address registration operation.

6. The network device of claim 1, wherein identifying the media access control forwarding table for the address registration operation comprises one of:

determining, based on a determination that the ethernet data plane header is associated with an untagged packet, that the media access control forwarding table is a forwarding table associated with a port on which the ethernet data plane header is received;

determining, based on a determination that the ethernet data plane header is associated with an 802.1q tagged packet, that the media access control forwarding table is a forwarding table associated with a virtual local area network (VLAN) identifier (VID);

determining, based on a determination that the ethernet data plane header is associated with an 802.1ad tagged packet, that the media access control forwarding table is a forwarding table associated with a service VID (S-VID); or determining, based on a determination that the ethernet data plane header is associated with an 802.1ah tagged packet, that the media access control forwarding table is a forwarding table associated with a backbone service instance identifier (I-SID).

7. The network device of claim 1, wherein the value in the destination media access control address field is a MAC Registration Group (MRG) Address.

8. The network device of claim 1, wherein the ethernet data plane header is associated with a payload.

9. The network device of claim 1, wherein the instructions, when executed by the at least one processor, cause the network device to perform:

determining, based on the value in the destination media access control address field, whether the ethernet data plane header is to be propagated to an upper hierarchy.

10. The network device of claim 9, wherein the instructions, when executed by the at least one processor, cause the network device to perform:

propagating the ethernet data plane header to the upper hierarchy based on a determination that the ethernet data plane header is to be propagated to the upper hierarchy.

11. A network device, comprising:

at least one processor; and at least one memory storing instructions that, when executed by the at least one processor, cause the network device to perform ethernet bridging functions for an ethernet network, wherein the ethernet bridging functions include maintaining a media access control forwarding table and forwarding ethernet frames based on media access control address lookups using the media access control forwarding table, wherein the ethernet bridging functions further include performing media access control address registration, wherein performing media access control address registration includes:

receiving an ethernet data plane header including a destination media access control address field and a source media access control address field, wherein the destination media access control address field includes a value indicative that the ethernet data plane header is being used to perform an address registration operation based on the source media access control address field;

determining, based on the value included in the destination media access control address field, that the address registration operation is an address purge operation;

identifying, based on a receiving context of the ethernet data plane header, the media access control forwarding table for the address purge operation;

determining, based on a value in the source media access control address field, that the address purge operation is a wildcard address purge operation; and performing the wildcard address purge operation by purging, from the media access control forwarding table, all media access control addresses which were learned on the receiving context of the ethernet data plane header.

12. A network device, comprising:

at least one processor; and at least one memory storing instructions that, when executed by the at least one processor, cause the network device to perform ethernet bridging functions for an ethernet network, wherein the ethernet bridging functions include maintaining a media access control forwarding table and forwarding ethernet frames based on media access control address lookups using the media access control forwarding table, wherein the ethernet bridging functions further include performing media access control address registration, wherein performing media access control address registration includes:

receiving an ethernet data plane header including a destination media access control address field and a source media access control address field, wherein the destination media access control address field includes a value indicative that the ethernet data plane header is being used to perform an address registration operation based on the source media access control address field;

determining, based on the value included in the destination media access control address field, that the address registration operation is an address purge operation;

identifying, based on a receiving context of the ethernet data plane header, the media access control forwarding table for the address purge operation;

determining, based on a value in the source media access control address field, that the address purge operation is a wildcard address purge operation; and performing the wildcard address purge operation by purging all media access control addresses included in the media access control forwarding table except for ones of the media access control addresses of the media access control forwarding table which were learned on the receiving context of the ethernet data plane header.

* * * * *